US012498963B2

United States Patent
Kumar et al.

(10) Patent No.: US 12,498,963 B2
(45) Date of Patent: Dec. 16, 2025

(54) USER-LEVEL INTERRUPTS IN VIRTUAL MACHINES

(71) Applicant: Intel Corporation, Santa Clara, CA (US)

(72) Inventors: Sanjay Kumar, Hillsboro, OR (US); Philip R. Lantz, Cornelius, OR (US); Rajesh M. Sankaran, Portland, OR (US); Gilbert Neiger, Portland, OR (US); Rupin H. Vakharwala, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 17/519,384

(22) Filed: Nov. 4, 2021

(65) Prior Publication Data

US 2023/0134657 A1 May 4, 2023

(51) Int. Cl.
*G06F 9/48* (2006.01)
*G06F 9/455* (2018.01)
*G06F 9/54* (2006.01)
*G06F 13/24* (2006.01)

(52) U.S. Cl.
CPC ........ *G06F 9/4812* (2013.01); *G06F 9/45558* (2013.01); *G06F 9/542* (2013.01); *G06F 13/24* (2013.01); *G06F 2009/45579* (2013.01)

(58) Field of Classification Search
CPC .... G06F 9/4812; G06F 9/45558; G06F 9/542; G06F 13/24; G06F 2009/45579
See application file for complete search history.

(56) References Cited

U.S. PATENT DOCUMENTS

| 8,910,158 B2 | 12/2014 | Neiger et al. |
| 9,910,699 B2 | 3/2018 | Sankaran et al. |
| 9,921,984 B2 | 3/2018 | Neiger et al. |
| 10,572,415 B2 | 2/2020 | Neiger et al. |
| 11,113,217 B2 | 9/2021 | Neiger et al. |

(Continued)

OTHER PUBLICATIONS

EPO European Search Report in EP Application Serial No. 22198286.1-1203 mailed on Mar. 3, 2023 (13 pages).

(Continued)

*Primary Examiner* — Ernest Unelus
(74) *Attorney, Agent, or Firm* — Nicholson De Vos Webster & Elliott LLP

(57) ABSTRACT

A system comprises a physical processor to execute a virtual machine manager to run, on a logical core, a virtual machine including a guest user application and a virtual CPU. Circuitry coupled to an external device is to receive an interrupt request from the external device for the guest user application, locate a first interrupt data structure associated with the guest user application, generate a first interrupt with the first interrupt data structure based on a first interrupt vector for the interrupt request, locate a second interrupt data structure associated with the virtual CPU, and generate a first notification interrupt for the virtual CPU with the second interrupt data structure based on a first notification vector in the first interrupt data structure. The circuitry may generate a second notification interrupt for the logical core using a second notification vector and a logical core identifier from the second interrupt data structure.

23 Claims, 11 Drawing Sheets

(56) References Cited

U.S. PATENT DOCUMENTS

2015/0058510 A1    2/2015  Neiger et al.
2016/0147679 A1    5/2016  Guddeti et al.
2018/0129619 A1    5/2018  Neiger et al.
2020/0341921 A1   10/2020  Neiger et al.
2021/0089480 A1*   3/2021  Chan ...................... G06F 13/24

OTHER PUBLICATIONS

Zhang Wang et al: "A survey of direct interrupt delivery techniques in I/O virtualization", 2017 8th IEEE International Conference on Software Engineering and Service Science(ICSESS), IEEE, Nov. 24, 2017 (Nov. 24, 2017), pp. 169-172, XP033333610, DOI: 10.1109/ICSESS.2017.8342889 [retrieved on Apr. 19, 2018] sect. III.B.

"Intel 64 and IA-32 Architectures Software Developer's Manual vol. 3A: System Programming Guide, Part 1", Intel Corporation, Sep. 2016, 468 pages, retrieved from https://www.intel.com/content/www/us/en/architecture-and-technology/64-ia-32-architectures-software-developer-vol-3a-part-1-manual.html, (Chapter 6, pp. 6-1 through 6-52).

"Intel Virtualization Technology for Directed I/O," Intel Architecture Specification, Revision 3.3, Apr. 2021, 295 pages, retrieved from http://kib.kiev.ua/x86docs/Intel/VT-d/D51397-013.pdf.

U.S. Appl. No. 17/462,975, filed Aug. 31, 2021 entitled, Delivering Interrupts to User-Level Applications (55 pages).

\* cited by examiner

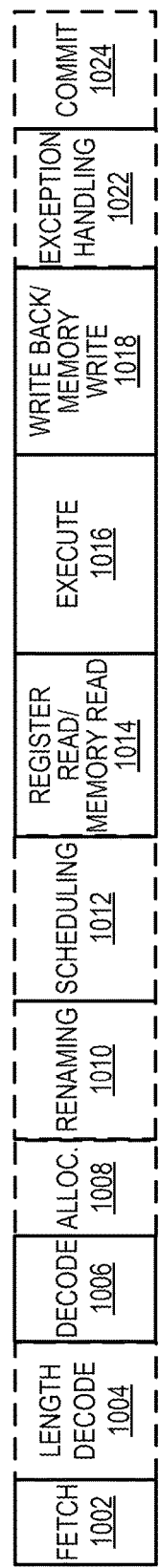
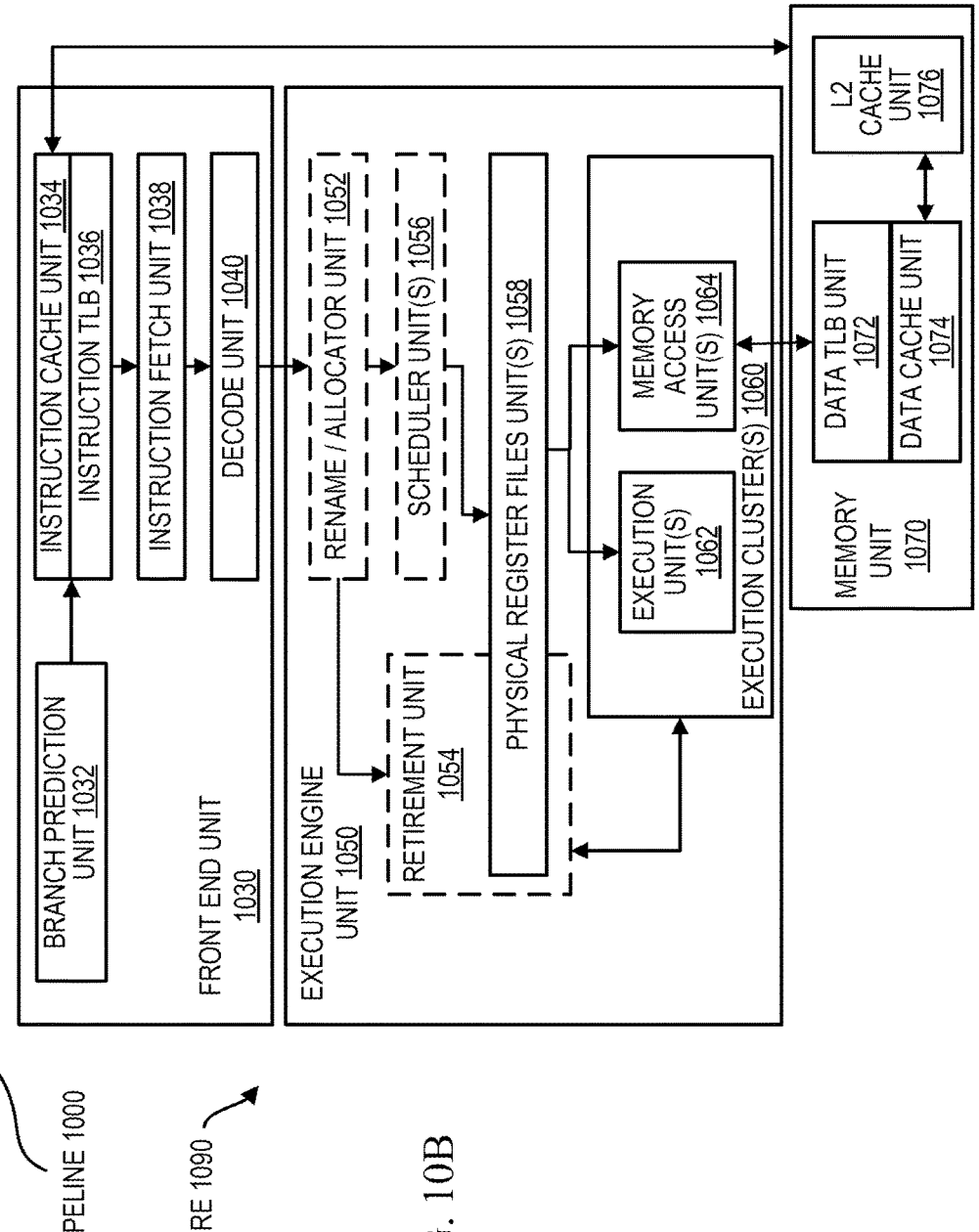
FIG. 10A
FIG. 10B

USER-LEVEL INTERRUPTS IN VIRTUAL MACHINES

TECHNICAL FIELD

The present disclosure relates in general to the field of processing systems, and more specifically, to user-level interrupts in virtual machines.

BACKGROUND

In computing systems, interrupts may be used to facilitate data transfer between a central processing unit (CPU) and devices that are external to the CPU, such as input/output (I/O) devices or accelerators. An external device may send an interrupt request to indicate to a CPU that a work is completed or that the external device is ready to communicate. Typically, an interrupt from a device may be delivered to a host operating system kernel, which then passes control to a driver that manages the device. In some configurations, however, the interrupt may be sent directly to the guest operating system kernel of a virtual machine or to a user-level application running on the host operating system.

BRIEF DESCRIPTION OF THE DRAWINGS

FIG. 10A is a block diagram illustrating both an exemplary in-order pipeline and an exemplary register renaming, out-of-order issue/execution pipeline in accordance with at least one embodiment.

FIG. 10B is a block diagram illustrating both an exemplary embodiment of an in-order architecture core and an exemplary register renaming, out-of-order issue/execution architecture core to be included in a processor in according to at least one embodiment.

DETAILED DESCRIPTION

Figure 1:
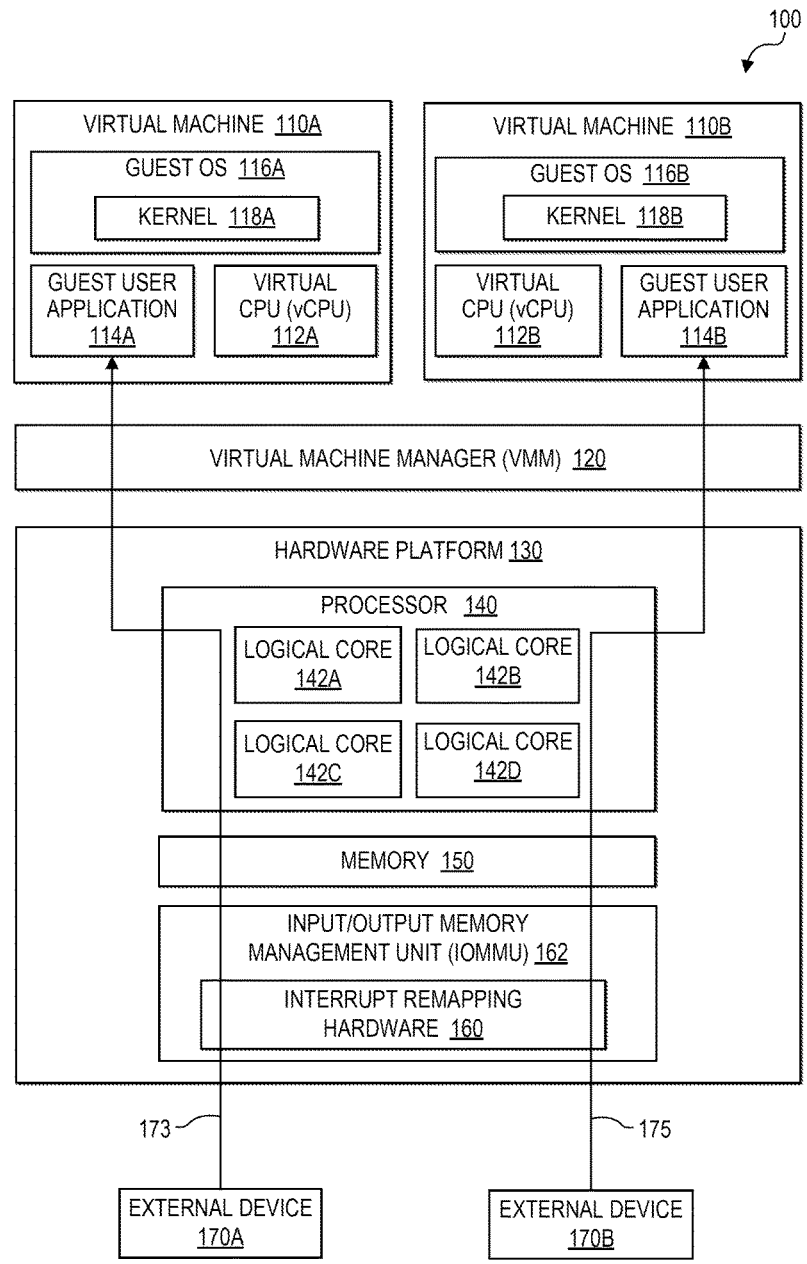
FIG. 1 is a block diagram illustrating an example computing system supporting interrupts for user-level applications in virtual machines according to at least one embodiment.

The present disclosure provides various possible embodiments, or examples, of systems, methods, apparatuses, architectures, and machine readable media for supporting interrupts for user-level applications in virtual machines. In particular, embodiments disclosed herein provide for delivering user interrupt notifications from input/output (I/O) devices or other devices (e.g., accelerators) external to the processor to user software applications in virtual machines (VMs) with low latency.

In some computing systems with one or more processors each having one or more cores, external devices may send notifications in the form of interrupts to the appropriate core of the appropriate processor to communicate with user-level applications. When an interrupt is generated by an external device, it may be delivered to the host operating system (OS) kernel of a CPU. The host OS kernel determines which software component is to handle the interrupt, such as a driver for the device operating at a kernel privilege level. The host OS kernel may call the software driver, which can manage communications between the user-level application and the external device. These host kernel managed interrupts can incur significant latency based on the multiple privilege level transitions that occur between the user-level application and the software driver operating in the kernel privilege level.

Computing systems may be configured to support user-level posted interrupts to minimize the latency incurred from multiple privilege level transitions when an interrupt is delivered to the host OS kernel. To achieve this, a "posted interrupt" feature in an input/output memory management unit (IOMMU) can be used. In a computing system enabling user-level posted interrupts, an external device generates an interrupt, and the interrupt may be delivered from the external device directly to a user-level application. The user-level posted interrupt can bypass the host OS kernel and be delivered directly to the user-level application. Thus, latency can be reduced by minimizing the privilege level transitions.

The posted interrupt feature of an IOMMU may also support kernel posted interrupts in a virtual machine environment. In a computing system enabling guest kernel posted interrupts, an external device generates an interrupt, and the interrupt may be delivered directly to a guest operating system (OS) kernel running in a virtual machine. The interrupt bypasses the host OS kernel on the physical processor, and instead, is delivered to the guest OS kernel directly. Thus, the overhead of the processing by the host OS kernel, such as re-routing the interrupt to the guest OS kernel, is avoided. These interrupt notifications are then passed to a guest device driver in the guest OS kernel. If the interrupt notification needs to be sent to a guest user application in the virtual machine, the guest device driver can send the interrupt notification to the guest user application via software-based notifications. Alternatively, the guest user application thread can request the guest OS block inside the kernel to be woken up when the guest interrupt occurs. Consequently, the latency for interrupt delivery to guest user applications can be high.

In several usages, external devices (e.g., accelerators, I/O devices) are directly assigned to guest user applications in virtual machines. For example, Data Plane Development Kit (DPDK), Storage Performance Development Kit (SPDK), and shared virtual memory (SVM) applications running in virtual machines may be set up to directly access a network interface card (NIC), non-volatile memory express (NVMe), or other accelerators. These applications require high performance and low latency input and output. Additionally, these applications may use interrupts for finding out when their input/output operations have completed. In some scenarios, external devices may be directly assigned to other guest user applications, such as guest system applications other than the operating system.

Given the high latency of interrupt delivery to guest user space (e.g., guest user applications running in a virtual machine), many applications today avoid using interrupts and instead use polling (e.g., spin waiting). With polling, processes may repeatedly check to see if a condition is true. In a multithreaded application, one thread can wait for other threads in a loop or 'spin' while repeated checking for the condition to be true. This technique consumes more power, and, on a hyperthreaded processor, consumes resources that could be used by another hardware thread. Alternatively, an application may execute a special wait instruction to 'poll' in low power state. Using a power efficient wait instruction still keeps the CPU thread occupied and the thread doesn't do any useful work during the wait period. Both polling and power efficient wait instructions require a thread of execution in the user-level application (e.g., a user thread) to cease doing useful work, which may not be acceptable.

A computing system for supporting user-level interrupts in virtual machines as disclosed herein can resolve many of the aforementioned issues (and more). In one or more embodiments, user-level interrupts in virtual machines can be implemented using "nested posting" of interrupts for direct delivery to guest user applications, which may run in an unprivileged level (e.g., Ring 3 on Intel® 64 and IA-32 Architectures or other similar unprivileged levels of other processors). Nested posting may be implemented on a platform in hardware, for example, in circuitry that manages memory accesses by external devices. It should be noted that an external device (e.g., an input/output device, or an accelerator) is external to a physical processor core and could either be integrated in the hardware platform (or components thereof) or separate from and communicatively coupled to the platform. Further, any number of implementations are possible, and accordingly, nested posting could be realized in hardware, software, firmware, or any suitable combination thereof.

In one or more embodiments, an interrupt-posting functionality of some platform components, such as an I/O memory management unit (IOMMU), may be exploited in nested posting. As previously described, with this interrupt-posting functionality, the platform processes an interrupt from an external device by posting (e.g., recording, writing, saving, etc.) information about the interrupt in a data structure (e.g., a kernel posted-interrupt descriptor (KPID)) configured by software. The posted interrupt in the KPID delivers the I/O interrupt directly to the guest OS kernel. In one or more embodiments of nested posting disclosed herein, first, the platform hardware posts an I/O interrupt to a first level data structure (e.g., guest user posted interrupt descriptor (GUPID)) for a guest user application running on a virtual CPU in a virtual machine. The hardware then delivers a corresponding notification interrupt to the virtual CPU in the virtual machine by posting the interrupt to a second level data structure (e.g., a KPID). Finally, the hardware generates a second level notification interrupt to a physical processor (e.g., to a logical core in the physical processor) corresponding to the virtual CPU in the virtual machine. The physical processor processes the second level notification interrupt to generate the first level notification interrupt from the KPID. The CPU further processes the first level notification interrupt to deliver the user level interrupt from the first level data structure (e.g., GUPID) to the designated user thread.

Nested posting advantageously enables an I/O interrupt to be directly delivered to a guest user application without taking a virtual machine exit (VM exit) and without taking a privilege level transition to the guest OS kernel. Accordingly, latency of interrupt delivery can be significantly reduced. In addition, nested posting also allows the guest user application to perform other tasks without polling or to be blocked waiting for the work completion. Thus, the guest user application can do useful work until completion of the I/O operation.

With reference now made to the drawings, FIG. 1 is a block diagram illustrating an example computing system 100 supporting interrupts for guest user applications in a virtual environment according to at least one embodiment. A brief discussion is now provided about some of the possible infrastructure that may be included in computing system 100. Computing system 100 may include a hardware platform 130, one or more virtual machines, such as virtual machines 110A and 110B, a virtual machine monitor (VMM) 120, and external devices 170. The hardware platform 130 can include one or more physical processors, such as processor 140, memory 150, interrupt remapping hardware 160, and one or more external devices 170A and 170B.

Generally, virtualization obscures hardware characteristics of a computing system and presents an abstract platform that can host other platforms, including different operating systems. VMM 120 (also known as a hypervisor) provides the capability of running multiple instances of operating systems and associated guest software concurrently in simulated computing environments referred to herein as "virtual machines." For example, in computing system 100, virtual machine 110A includes a virtual central processing unit (CPU) 112A on which a guest operating system (guest OS) 116A with a kernel 118A runs. The guest OS 116A manages, and coordinates resources for, a guest user application 114A logically running on the guest OS 116A in virtual machine 110A. Similarly, virtual machine 110B includes a virtual central processing unit (CPU) 112B on which a guest operating system (guest OS) 116B with a kernel 118B runs. The guest OS 116B manages, and coordinates resources for, a guest user application 114B logically running on the guest OS 116B in virtual machine 110B. The operating systems and applications can be run concurrently by dynamically allocating the hardware resources to guest operating systems (e.g., 116A and 116B) and guest user applications (e.g., 114A and 114B) as needed. Virtual CPUs 112A and 112B may each run on a logical core, which may be on the same physical core of a physical processor (e.g., processor 140) or different physical cores of the physical processor, or may run on different physical processors assigned to virtual machines 110A and 110B. In some scenarios, a virtual CPU may correspond to more than one physical core and/or more than one physical processor assigned to a single virtual machine. It should also be appreciated that virtual machines 110A and 110B may include more than one virtual CPU and each virtual VPU may run on a different logical core of the physical processor 140. Virtual CPUs may also be referred to herein as "virtual processor" or "virtual logical core."

In computing system 100 of FIG. 1, VMM 120 may be a type-1 native/bare-metal hypervisor that runs directly on hardware (e.g., processor 140) to control the hardware and manage the guest operating systems. In alternative configurations, VMM 120 may be a type-2 or hosted hypervisor that runs on an operating system. Physical hardware beneath VMM 120 may include processor 140, memory 150, and interrupt remapping hardware 160.

A physical processor (or processor socket) typically refers to an integrated circuit, which potentially includes any number of other processing elements, such as cores or hardware threads. In computing system 100, processor 140 may include a central processing unit (CPU), a single-core or multi-core processor, a microprocessor, embedded processor, a digital signal processor (DSP), a system-on-a-chip (SoC), a co-processor, or any other processing device to execute code. In the example in FIG. 1, processor 140 may be a multi-threading, multicore processor that includes logical cores 142A, 142B, 142C, and 142D. It should be apparent, however, that embodiments could be implemented in a single core processor or a multicore processor with two or more cores. Logical cores 142A-142D of processor 140 may represent distinct processing units that can run different processes, or different threads of a process, at the same time. Each logical core may include a respective thread of execution, and any number of logical cores could be running (or could be idle) on the physical processor at any given time. In some implementations, each logical core 142A-142D represents a single physical core. In this scenario, physical processor 140 would include four physical cores corresponding respectively to the four logical cores 142A-142D. In other implementations (e.g., with hyperthreading), each physical core of a physical processor may include multiple logical cores. For example, physical processor 140 could contain a first physical core with two logical cores 142A and 142C, and a second physical core with two other logical cores 142B and 142D. For illustration purposes (and ease of description), in the example computing system 100 of FIG. 1, physical processor 140 is assigned to virtual machine 110A and to virtual machine 110B, and virtual CPU 112A and virtual CPU 112B each run on one logical core (e.g., 142A and 142B, respectively) of respective physical cores (which may or may not have hyperthreading) in physical processor 140. However, it should be appreciated that other implementations are possible. For example, in other scenarios (e.g., with hyperthreading) virtual CPUs 112A and 112B could run on multiple logical cores within the same physical core.

Memory 150 can include any form of volatile or non-volatile memory including, without limitation, magnetic media (e.g., one or more tape drives), optical media, random access memory (RAM), dynamic random access memory (DRAM), read-only memory (ROM), flash memory, removable media, or any other suitable local or remote memory component or components. Memory 150 may be used for short, medium, and/or long term storage of computing system 100. Memory 150 may store any suitable data or information utilized by other elements of the computing system 100, including software embedded in a computer readable medium, and/or encoded logic incorporated in hardware or otherwise stored (e.g., firmware). Memory 150 may store data that is used by processors, such as processor 140. Memory 150 may also comprise storage for instructions that may be executed by processor 140 of computing system 100. Memory 150 may comprise one or more modules of system memory (e.g., RAM, DRAM) coupled to processor 140 in computing system 100 through memory controllers (which may be external to or integrated with the processors and/or accelerators). In some implementations, one or more particular modules of memory may be dedicated to a particular processor in computing system 100, or may be shared across multiple computing systems. Memory 150 may further include storage devices that comprise non-volatile memory such as one or more hard disk drives (HDDs), one or more solid state drives (SSDs), one or more removable storage devices, and/or other media.

External devices 170A and 170B may represent any type of I/O device that is external to processors, such as processor 140, of computing system 100 and that may be the source for an interrupt request. For example, external devices 170A and 170B may represent input/output (I/O) devices or peripherals. Nonlimiting examples of I/O devices or peripherals may include a keyboard, mouse, trackball, touchpad, digital camera, monitor, touch screen, USB flash drive, network interface (e.g., network interface care (NIC), smart NIC, etc.), hard drive, solid state drive, printer, fax machine, other information storage device, etc. External devices 170A and 170B may further represent one or more accelerators, including but not necessarily limited to, a graphics processing unit (GPU), vision processing unit (VPU), deep learning processor (DLP), inference accelerator, application-specific integrated circuit (ASIC), and/or field-programmable gate array (FPGA), among others. Any one or more external devices 170A and 170B may be embodied as a discrete component communicatively coupled to hardware platform 130, as an integrated component of hardware platform 130, as a part of another device or component integrated in hardware platform 130, or as a part of another device or component that is separate from, and communicatively coupled to, hardware platform 130.

Interrupt remapping hardware 160 may be configured with circuitry that includes logic to achieve nested posting for interrupts to guest user applications. In an example implementation, an input/output memory management unit (IOMMU) 162 may be configured with interrupt remapping hardware 160 to enable nested posting for interrupts to guest user applications, as described herein. Generally, an IOMMU can connect a direct-memory-access-capable (DMA-capable) I/O bus to main memory and perform I/O functions such as DMA-remapping and interrupt-remapping for external devices 170A and 170B, such as I/O devices and accelerators. An IOMMU also provides hardware support for interrupt posting including processing of interrupt requests from I/O devices that are directly assignable to a virtual machine. One example configuration of an IOMMU is provided in "Intel® Virtualization Technology for Directed I/O, Architecture Specification," April 2021, Revision 3.3. Although an IOMMU according to the aforementioned specification may be used to implement interrupt remapping hardware 160 to enable nested posting for interrupts to guest user applications, it should be noted that numerous variations of an IOMMU, including IOMMUs designed according to alternative specifications, may be used instead. Furthermore, interrupt remapping hardware 160 to enable nested posting may alternatively be implemented as a discrete component or integrated with any other component or element in hardware platform 130, including any other component or element typically used for interrupt processing.

In at least some configurations of IOMMU 162 (or interrupt remapping hardware 160), interrupt requests may be posted to user-level applications. In some scenarios, an interrupt request for a user-level application (e.g., running on one or more logical core(s) 142A-142B) may not be immediately deliverable (e.g., when the recipient user application thread is currently not running). In this case, the IOMMU 162 can post the interrupt to a specified memory location storing a particular interrupt data structure assigned to the user-level application to be interrupted. In one example, to post an interrupt to a user-level application, a bit corresponding to the appropriate interrupt vector may be set in the interrupt data structure assigned to the user-level application. The interrupt data structure for posting an interrupt to a user-level application running on a physical processor may be referred to herein as "user posted interrupt descriptor" or "UPID." The user-level interrupt posting is optionally followed by generating a notification interrupt to the logical core currently running the application thread. The UPID contains a notification vector and an identifier of the logical core that needs to be interrupted. The notification interrupt can be generated based on the identifier of the logical core and the notification vector contained in the UPID. Once the interrupt is posted and the notification interrupt is generated, at the next instruction boundary the logical core can read the UPID to determine whether an interrupt is posted and then process the interrupt.

At least some configurations of IOMMU 162 (or interrupt remapping hardware 160) may also enable interrupt requests to be posted to guest OS kernels. In some scenarios, interrupt requests for a guest OS kernel (e.g., guest OS kernel 118A or 118B) may not be immediately deliverable (e.g., when the recipient virtual CPU is currently not running). In this case, the IOMMU 162 can post the interrupt to a specified memory location storing a particular interrupt data structure assigned to the virtual CPU (vCPU) running the guest OS to be interrupted. In one example, to post an interrupt for a guest OS kernel, a bit corresponding to the appropriate interrupt vector may be set in the interrupt data structure assigned to the vCPU. The interrupt data structure for posting an interrupt to a vCPU (e.g., vCPUs 112A or 112B) may be referred to herein as a "kernel posted interrupt descriptor" or "KPID." The kernel interrupt posting is also optionally followed by generation of a notification interrupt to the logical core currently running the virtual CPU (vCPU). The KPID contains a notification vector and an identifier of the logical core that needs to be interrupted. The notification interrupt can be generated based on the identifier of the physical processor and the notification vector contained in the KPID. Once the interrupt is posted and the notification interrupt is generated, at the next instruction boundary, the logical core can read the KPID to determine whether an interrupt is posted and then process the interrupt.

The operating system of the computing system 100 can set up each user-level thread that wants to receive direct user interrupts with its own UPID. Similarly, VMM 120 can set up each virtual CPU (e.g., virtual CPUs 112A and 112B) that wants to receive direct kernel interrupts with its own KPID.

Interrupt remapping hardware 160 may be configured to enable nested posting for interrupt requests from external devices to guest user applications in virtual machines. For example, in one or more embodiments, nested posting as described herein enables interrupt posting of an interrupt request 173 from external device 170A to guest user application 114A of virtual machine 110A, and interrupt posting of an interrupt request 175 from external device 170B to guest user application 114B of virtual machine 110B. Nested posting enables the I/O interrupts 173 and 175 to be delivered directly to identified guest user applications 114A and 114B. In one embodiment of nested posting, a user-level interrupt posting for a user-level application works as first level interrupt posting, and a kernel interrupt posting for a guest OS kernel works as second level interrupt posting, which will be further described herein.

Figure 2:
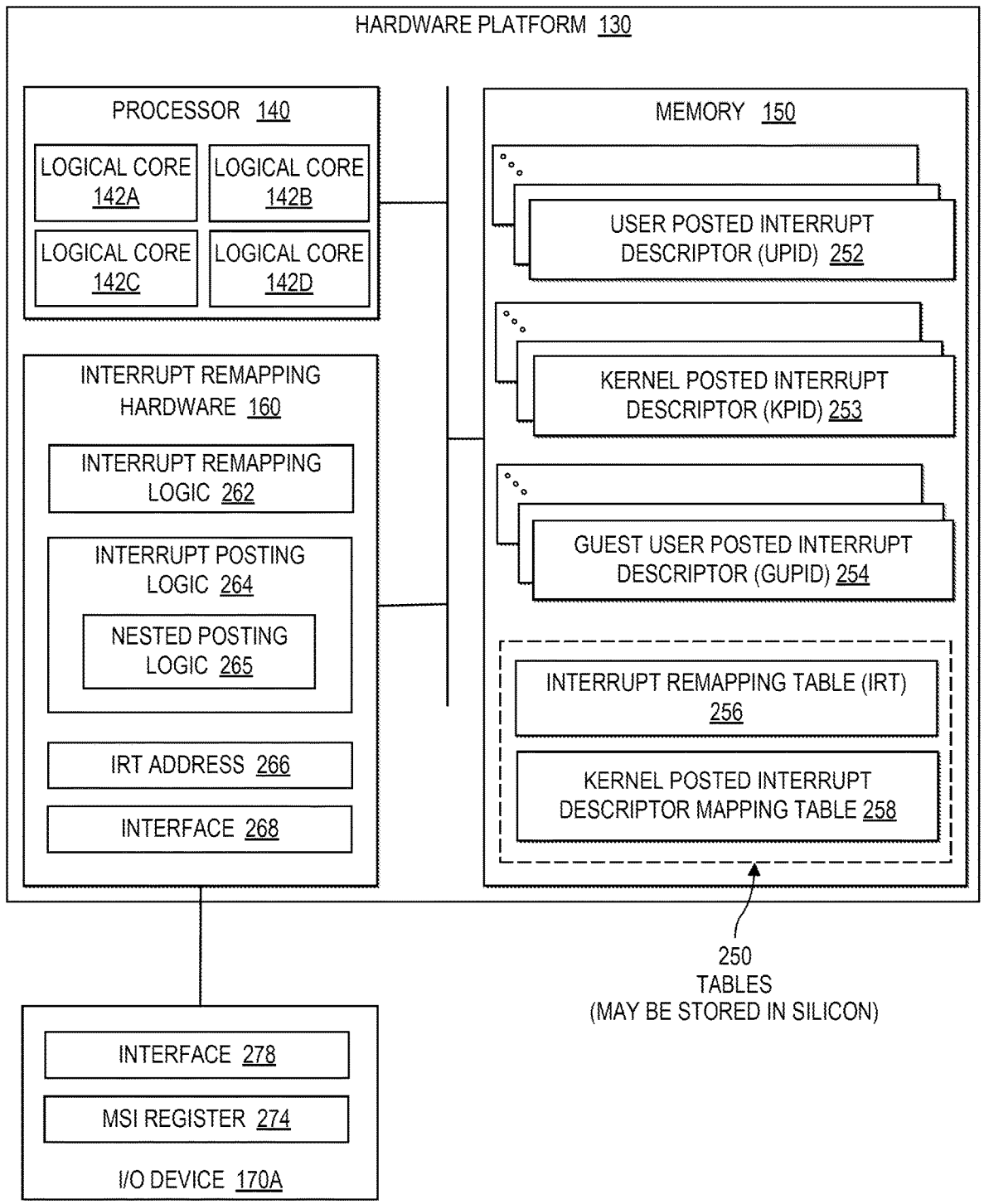
FIG. 2 is a block diagram illustrating additional possible details of a computing system supporting interrupts for user-level applications in virtual machines according to at least one embodiment.

FIG. 2 is a block diagram illustrating additional possible details of hardware platform 130 and external device 170A of computing system 100 according to at least one embodiment. Processor 140, including its logical cores 142A-142D, memory 150, interrupt remapping hardware 160, and external device 170A may be coupled to each other directly or indirectly using any suitable form of connection or means of communication enabling data transmission and other signaling, including but not limited to parallel, serial, synchronous, asynchronous, wired, wireless and/or other bus or point-to-point connection or interconnect.

Interrupt remapping hardware 160 may include interface 268 to receive data, messages, requests, signals, and any other information (e.g., interrupt request) from external devices, such as external device 170A, and any other components or elements of computing system 100. Interface 268 also enables interrupt remapping hardware 160 to send data, messages, requests, signals and any other information to external devices such as external device 170A and to other components and elements of computing system 100. Similarly, each external device such as external device 170A, for example, includes an interface such as interface 278, to send and/or receive data, messages, requests, signals, and any other information. Such information may be sent to and/or received from interrupt remapping hardware 160 and/or other components and elements of computing system 100. In one or more embodiments, an interface standard such as PCIe (peripheral component interconnect express) may be implemented in computing system 100 to connect one or more external devices to other components and elements in the hardware platform.

Memory 150 may store multiple instances of data structures for posting interrupts from external devices (e.g., external device 170A) to guest user applications (e.g., guest user application 114A) in virtual machines. For example, memory 150 may store data structures such as a guest user posted interrupt descriptor (GUPID) 254 and a kernel posted interrupt descriptor (KPID) 253. In some embodiments, a user posted interrupt descriptor (UPID) 252 may also be stored in memory 150 to enable interrupts to user-level applications. The interrupt data structures 252, 253, and 254 may alternatively be stored in the interrupt remapping hardware 160, in IOMMU 162, or any other location that is accessible to IOMMU 162 and logical cores 142A-142D of processor 140.

Memory 150 may also store tables 250 (or other suitable storage structures) configured to facilitate searching information that is mapped, linked, indexed or otherwise associated to other information. In one or more embodiments, an interrupt remapping table (IRT) 256 in memory 150 may store multiple entries corresponding to interrupt requests from external devices and may be configured by system software. In some implementations, the entries may indicate whether the corresponding interrupt request is to be interpreted via a remappable interrupt format or a posted interrupt format. For remappable interrupts, the interrupt request may be processed by hardware and remapped to the appropriate logical core.

In one or more embodiments, entries in interrupt remapping table 256 that indicate a posted interrupt format can correspond to interrupt requests for a guest user application in a virtual machine, for a guest OS kernel in a virtual machine, or for a user-level application. Each entry can include a posted type field that contains a value indicating which type of posted interrupt request has been received. For example, a posted type could include a user-level posted type, a guest kernel posted type, or a nested posted type. In one example, a user-level posted type (UP) indicates that interrupt request is for a host user-level application, a kernel posted type (KP) indicates that the interrupt request is for a guest OS kernel, and a nested posted type (NP) indicates that the interrupt request is for a guest user application in a virtual machine. In one example implementation, interrupt-remapping functionality of IOMMU 162 can be extended to support the "posted type" field in each interrupt remapping entry.

Each entry may also include sufficient information to locate the corresponding data structure for the interrupt request. For user-level and guest OS kernel interrupts, an entry may include a memory address (e.g., in the form of a pointer) to a data structure corresponding to the interrupt request. For guest user application interrupts, an entry may include a first memory address to a data structure for the guest user application in a virtual machine and a second memory address to a mapping table (e.g., 258) for pointers to data structures associated with guest OS kernel interrupts.

Tables 250 may also include a kernel posted interrupt descriptor (KPID) mapping table (KPIDPT) 258. KPID mapping table 258 may be configured as part of the interrupt remapping structure to map identifiers (vCPU IDs) of virtual CPUs, such as virtual CPUs 112A and 112B, to their respective KPID data structures (e.g., KPID 253). In one embodiment, the KPID mapping table entries contain the KPID itself. In another embodiment, the KPID mapping table entries contain a memory address, which may be embodied as a pointer, to the KPID data structure (e.g., KPID 253). In at least one implementation, KPID mapping table 258 could be a single level or multi-level table and could be indexed by vCPU IDs. Further, it should be noted that either or both of tables 250, including KPID mapping table 258 and interrupt remapping table 256, could be implemented in memory 150 or in silicon integrated with another hardware component (e.g., IOMMU 162, interrupt remapping hardware 160, etc.) or as a discrete component.

Interrupt remapping hardware 160 may include interrupt remapping logic 262, interrupt posting logic 264, which includes nested posting logic 265, and an interrupt remapping table (IRT) address 266. The IRT address may be provided in a register (or may be stored in memory or another storage location). In at least one embodiment, IRT address 266 is embodied as a pointer to interrupt remapping table 256. Interrupt remapping logic 262, interrupt posting logic 264, and nested posting logic 265 may be implemented using any suitable circuitry and optionally, associated firmware and/or software to perform their intended functions as described herein.

Interrupt remapping logic 262 may be configured to receive interrupt requests from external devices, such as external device 170A, to identify interrupt requests that are to be interpreted via a posted interrupt format, and for each identified interrupt request that is to be interpreted in a posted interrupt format, to determine which posted type (e.g., UP, KP, or NP) is associated with that identified interrupt request. Interrupt remapping logic 262 may use at least a portion of the interrupt request from the external device to search interrupt remapping table 256 for an entry corresponding to the interrupt request. The entry may be found in the interrupt remapping table 256 using a handle, which could be an entry number, an address, a pointer, an index, or any other locator of or to a particular entry in the interrupt remapping table 256. The handle may be a value supplied directly or indirectly by the interrupt request. For example, the handle may be embodied as the interrupt request or a portion thereof.

External devices, such as external device 170A, may also include a register or other storage location for storing information that may be provided in an interrupt request and used by interrupt remapping logic 262 to find an entry in interrupt remapping table 256 that corresponds to the interrupt request. In one implementation using a message-signaled interrupt (MSI) delivery method, which is supported in a peripheral component interface express (PCIe) bus, external device 170A (or any other external device capable of initiating an interrupt) may include an MSI register 274 to be used to generate an interrupt request for external device 170A. In one example, MSI register 274 can include a 32-bit address field and a 32-bit data field, with a 16-bit handle included in the address bits. In some scenarios, a sub-handle may be included in the data field. The MSI register 274 may be used to generate an interrupt request that similarly includes a 64-bit address field, a 32-bit data field, a handle in the address field, and optionally, a sub-handle in the data field. Although in one implementation the handle may comprise 16 bits, it should be apparent that the handle may be implemented using more or less bits and the interrupt request itself may be implemented with more or less bits than 64 bits.

Nested posting logic 265 may be configured to handle interrupt requests that have been determined to have a posted type of NP (nested posting), e.g., by interrupt remapping logic 262. To handle an NP-type interrupt request for a guest user application (e.g., 114A) in a virtual machine (e.g., 110A), nested posting may be used to post an interrupt vector to an interrupt data structure (e.g., GUPID) associated with the guest user application and then conditionally, to generate notification interrupts for the corresponding virtual CPU (e.g., 112A) and/or the corresponding logical core (e.g., 142A) of a physical processor (e.g., 140). In the first level of posting, an interrupt vector from an interrupt remapping table entry that corresponds to the interrupt request is posted to an interrupt data structure (e.g., GUPID) associated with the guest user application. In the second level of posting an identifier of the virtual CPU in the virtual machine may be used to search KPID mapping table 258 to find an interrupt data structure (e.g., KPID) corresponding to the virtual CPU, or a pointer to the KPID corresponding to the virtual CPU. The notification vector from the GUPID can be posted as an interrupt vector in the KPID. If a notification interrupt needs to be generated for the posted notification interrupt in the KPID, then the notification vector in the KPID and the notification destination in the KPID can be used to deliver a notification interrupt to the appropriate logical core.

In some embodiments, the second level of posting may be conditional based on certain indicators in the interrupt data structure (e.g., GUPID) corresponding to the guest user application and possibly the interrupt data structure (e.g., KPID) corresponding to the virtual CPU. For example, the GUPID may include a bit (e.g., a suppress notification (SN) bit) that can indicate whether to allow non-urgent interrupts for the virtual CPU to be posted without generating a notification interrupt to the virtual CPU. The GUPID may also include a bit (e.g., outstanding notification (ON) bit) that can indicate whether a notification event is outstanding for the particular GUPID. If a notification event for the GUPID is outstanding, then another notification event is not generated. If there is no outstanding notification event for the GUPID, then a notification event is generated. Similarly, the KPID may contain the same bits, which may indicate whether a notification interrupt is to be generated for a logical core of the physical processor.

Figure 3:
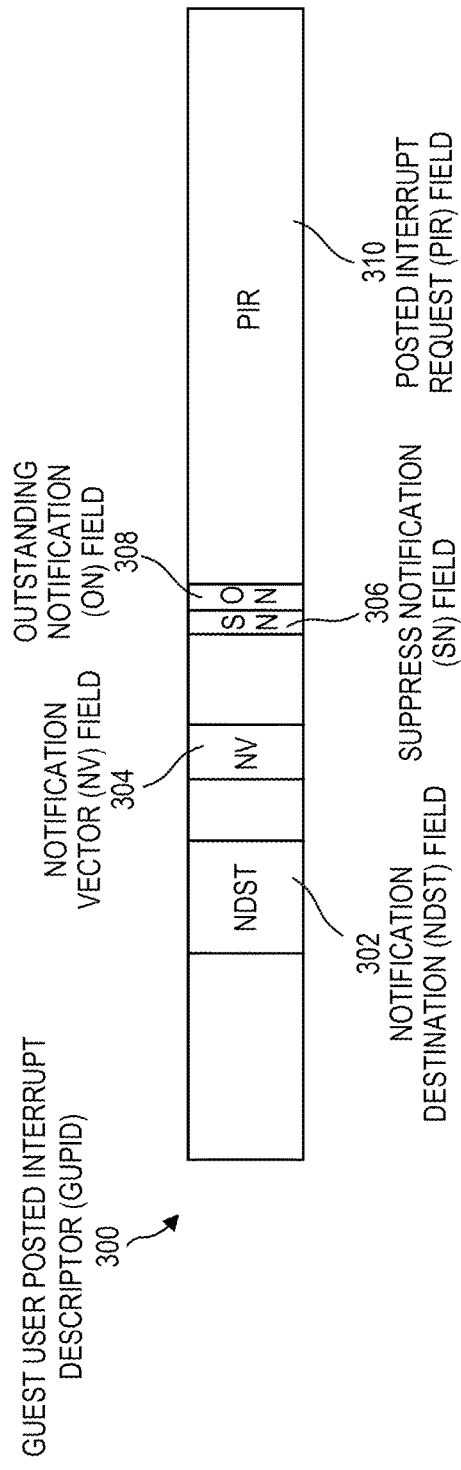
FIG. 3 is a schematic illustration of an example data structure for a guest user-level posted interrupt according to at least one embodiment.

FIG. 3 is a schematic illustration of an example interrupt data structure for a guest user posted interrupt, referred to as a guest user posted interrupt descriptor (GUPID) 300, according to at least one embodiment. System software, such as the guest OS can allocate memory for GUPID 300. For example, guest OS 116A could allocate memory for GUPID 300 to be used for posting an interrupt for guest user application 114A in virtual machine 110A. GUPID 300 illustrates one possible embodiment of an interrupt data structure for a guest user posted interrupt, however, numerous modifications in content, fields, and field sizes are possible in one or more embodiments presented in the disclosure.

In at least one implementation, GUPID 300 is a 16-byte sized and 64-byte aligned data structure including multiple bit-fields. The bit-fields can include (but are not necessarily limited to) a notification destination (NDST) field 302, a notification vector (NV) field 304, a suppress notification (SN) field 306, an outstanding notification (ON) field 308, and a posted interrupt request (PIR) field 310. PIR field 310 may include the lowest 8 bytes of the 16-byte GUPID to form a 64-bit posted interrupt register. Each bit in the 64-bit register may correspond to one of 64 vectors to be delivered to a guest user application associated with the GUPID 300. Setting a bit in PIR field 310 effectively posts an interrupt request for the interrupt vector that corresponds to the bit that was set.

SN field 306 and ON field 308 each may be a 1-bit notify event flag that indicates whether a notification interrupt is to be generated or not for a virtual CPU corresponding to the guest user application associated with the GUPID 300. The value of the bit in SN field 306 can indicate whether notification events (e.g., to the virtual CPU) must be suppressed when posting interrupts to a particular GUPID, such as GUPID 300. System software, such as guest OS 116A, may set this bit (e.g., to 1) at any time to suppress notification events (e.g., when the associated guest user application 114A is not running because it is in the OS scheduler wait queue). The value of the bit in ON field 308 can indicate whether a notification event for this particular GUPID 300 is currently outstanding for the associated virtual CPU. If a notification interrupt has already been generated for GUPID 300, and is pending processing by the virtual CPU, then the ON bit may be set (e.g., to 1) to indicate that a notification event is outstanding. In this scenario, another notification interrupt may not be generated. The ON bit may be set by IOMMU when it generates a notification interrupt and may be cleared by the CPU as part of processing the notification event.

NDST field 302 may be 32 bits that store an identifier of the destination of the interrupt request. For GUPID 300, the identifier may be an identifier of the virtual CPU (e.g., 112A) on which the guest user application (e.g., 114A) is running. The identifier for a virtual CPU may be referred to herein as a "virtual CPU ID" or "virtual CPU identifier," and may not match an identifier of the logical core of the physical processor on which the virtual CPU is running.

NV field 304 may be a 1-byte virtual interrupt vector value to be used to post a notification interrupt (e.g., in a kernel posted interrupt descriptor (KPID)) for the virtual CPU on which the guest user application is running. System software, such as guest OS 116A, may determine which virtual interrupt vector to use for this GUPID 300 and program the NV field 304 with the appropriate virtual interrupt vector value.

Figure 4:
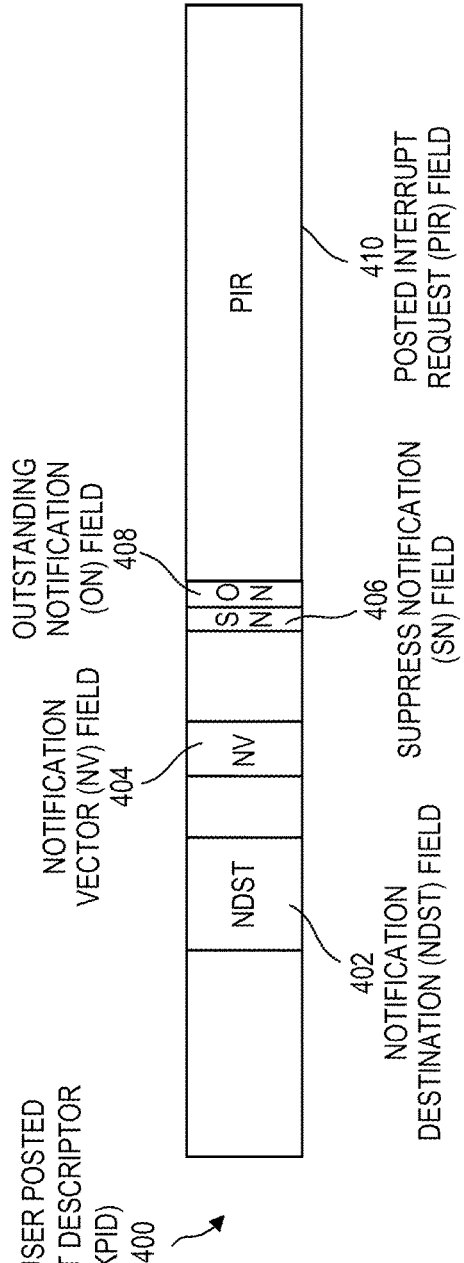
FIG. 4 is a schematic illustration of an example data structure for a kernel posted interrupt according to at least one embodiment.

FIG. 4 is a schematic illustration of an example interrupt data structure for a kernel posted interrupt, referred to as a kernel posted interrupt descriptor (KPID) 400, according to at least one embodiment. The VMM can allocate memory for KPID 400. For example, VMM 120 could allocate memory for KPID 400 to be used for posting a notification interrupt for virtual CPU 112A in virtual machine 110A. KPID 400 illustrates one possible embodiment of an interrupt data structure for a kernel posted interrupt, however, numerous modifications in content, fields, and field sizes are possible in one or more embodiments presented in the disclosure.

In at least one implementation, KPID 400 is a 64-byte sized and 64-byte aligned data structure including multiple bit-fields. The bit-fields can include (but are not necessarily limited to) a notification destination (NDST) field 402, a notification vector (NV) field 404, a suppress notification (SN) field 406, an outstanding notification (ON) field 408, and a posted interrupt request (PIR) field 410. PIR field 410 may include the lowest 32 bytes of the 64-byte KPID to form a 256-bit posted interrupt register. Each bit in the 256-bit register may correspond to one of 256 vectors to be delivered to a particular virtual processor (e.g., virtual CPU 112A) associated with the KPID 400. When the interrupt request is a nested posting (NP) type, setting a bit in PIR field 410 effectively posts a notification interrupt by setting the bit that corresponds to a notification vector, e.g., obtained from a GUPID for guest user application 114A running on virtual CPU 112A.

SN field 406 and ON field 408 each may be a 1-bit notify event flag that indicates whether a notification interrupt is to be generated or not for a logical core of a physical processor corresponding to the virtual CPU associated with the KPID 400. The value of the bit in SN field 406 can indicate whether notification events (e.g., to the logical core of the physical processor) must be suppressed when posting interrupts to a particular KPID, such as KPID 400. The VMM 120 may set this bit (e.g., to 1) at any time to suppress notification events (e.g., when the associated virtual CPU 112A is not running because it is in the VMM scheduler wait queue). The value of the bit in ON field 408 can indicate whether a notification event for this particular KPID 400 is currently outstanding for the associated logical core. If a notification interrupt has already been generated for KPID 400, and is pending processing by the logical core, then the ON bit may be set (e.g., to 1) to indicate that a notification event is outstanding. In this scenario, another notification interrupt may not be generated. The ON bit may be set by the IOMMU when it generates a notification interrupt and may be cleared by the CPU as part of processing the notification event.

NDST field 402 may be 32 bits that includes an identifier of the destination of the interrupt request. For KPID 400, the identifier may be an advanced programmable interrupt controller identifier (APIC ID) of the logical core of the physical processor (e.g., 140) on which the virtual CPU (e.g., 112A) that received a notification interrupt for the interrupt request targeting a guest user application (e.g., 114A) is running (or is scheduled to run). At any given time, a logical core on which a virtual CPU is running may change (e.g., due to migration, load balancing, etc.). Accordingly, system software may reprogram the NDST field 402 with a new APIC identifier for the new logical core to which the virtual CPU corresponds. The logical core identifier may be referred to herein as a "CPU identifier" or "CPU ID." Additionally, the physical processor to which a virtual CPU corresponds (e.g., the physical processor that includes the logical core where the target virtual CPU runs or is expected to run), may be referred to herein as the "designated physical processor."

NV field 404 ("Notification Vector") may include eight bits to indicate the physical vector to be used for the notify event. System software may determine which physical vector to use for this KPID 400 and program the NV field 404 with the appropriate physical vector. When a notify event is delivered to the logical core, the logical core may use the physical vector to determine which virtual CPU has pending posted interrupts in its posted-interrupt descriptor. In one example, the logical core may use the physical vector to determine if this is a posted interrupt notification (instead of a normal interrupt) and subsequently determine which interrupt vector(s) was posted (which may be a notification interrupt for GUPID when the interrupt request is a nested posting (NP) type) in the currently running vCPU's KPID. Therefore, embodiments of the present invention provide for a single physical vector per virtual CPU, instead of a physical vector for each virtual interrupt.

Figure 5:
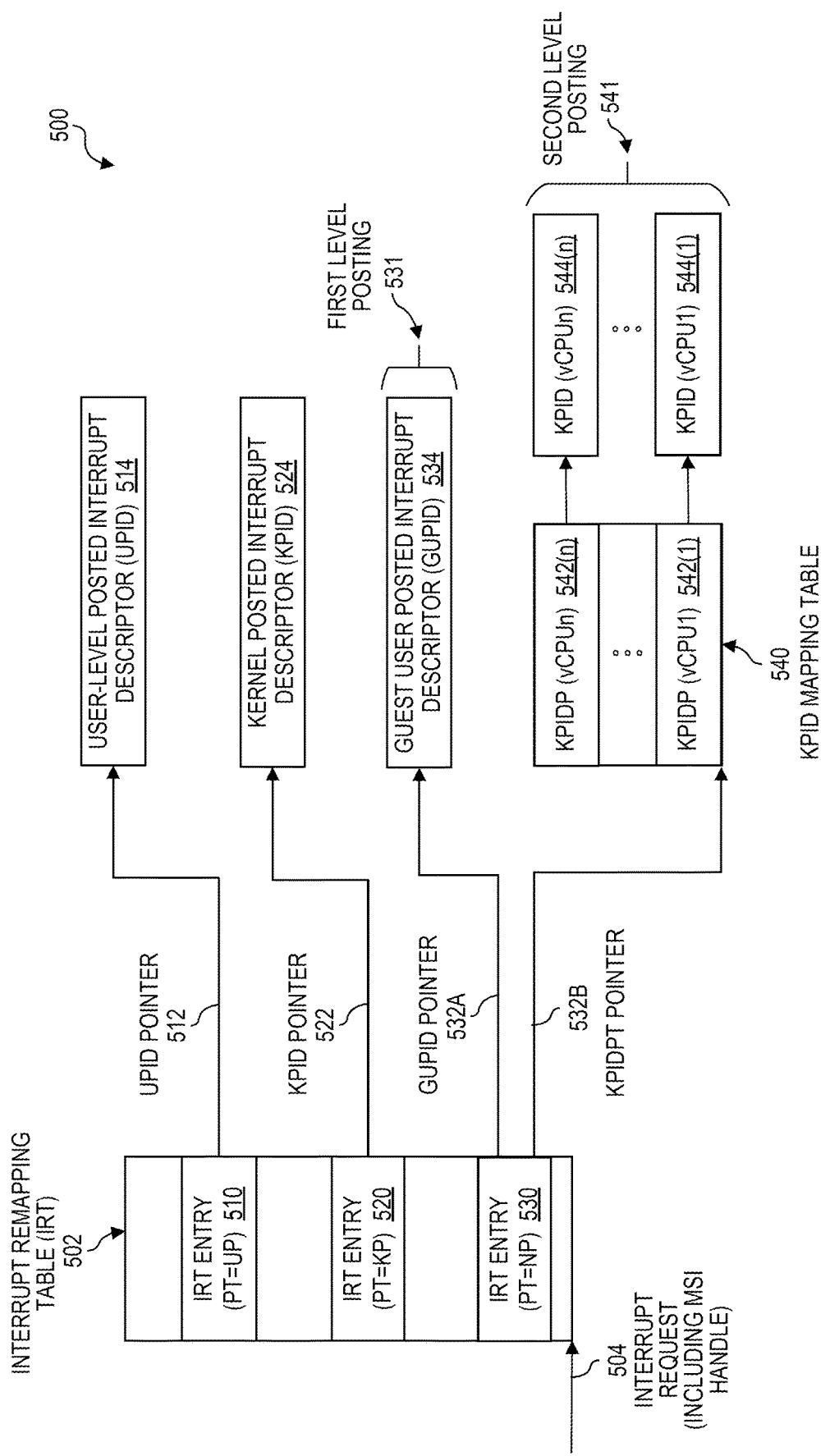
FIG. 5 is a block diagram illustrating an example operational flow in components of a hardware platform to process an interrupt request for a guest user application according to at least one embodiment.

FIG. 5 is a block diagram illustrating an example operational flow 500 in components of a hardware platform to process an interrupt request for a guest user application according to one or more embodiments. Structural components can include an interrupt remapping table (IRT) 502 (similar to IRT 256 of FIG. 2), and a kernel posted interrupt descriptor (KPID) mapping table 540 (similar to KPIDPT 258 of FIG. 2). Data structures for various posted interrupts shown in FIG. 2 include a user posted interrupt descriptor 514 (similar to UPID 252 of FIG. 2) used for a user-level interrupt, a kernel posted interrupt descriptor 524 (similar to KPID 253 of FIG. 2) used for a guest kernel interrupt, kernel posted interrupt descriptors 544(1)-544(nN) (similar to KPID 253 of FIG. 2, KPID 400 of FIG. 4) used for notification interrupts to virtual CPU in response to a guest user application interrupt, and a guest user posted interrupt descriptor 534 (similar to GUPID 254 of FIG. 2, GUPID 300 of FIG. 3) used for a guest user application interrupt. In one example, one or more operations shown in operational flow 500 may be performed in hardware platform 130, and more particularly, interrupt remapping logic 262 and/or interrupt posting logic 264 of interrupt remapping hardware 160.

In FIG. 5, an interrupt request 504 is received from an external device, such as external device 170A or 170B. The interrupt request 504 may contain a handle (e.g., an entry number, an address, a pointer, an index, or any other locator of or to a particular entry in IRT 502) that can be used to identify an entry in IRT 502 corresponding to the interrupt request. The identified entry may indicate whether interrupt request 504 is to be interpreted via a remappable interrupt format or a posted interrupt format. In this example, only posted interrupt formats are described.

Entries in IRT 502 corresponding to posted interrupt requests (e.g., interrupt requests having a posted interrupt format) may contain a posted type field that specifies the type of posted interrupt requests corresponding to the entry. The interrupt request is processed according to the particular posted type specified in the entry. IRT entry 510 specifies a user-level posted type (UP). Accordingly, if interrupt request 504 is targeting a user-level application running on a logical core of a physical processor, then interrupt request 504 may be mapped to IRT entry 510 (e.g., based on the handle in the interrupt request 504), and the interrupt request 504 may be processed as a user-level interrupt. A UPID pointer 512 is obtained from IRT entry 510 to access UPID 514 and an interrupt vector (indicated in IRT entry 510) is posted in the UPID 514 for the user-level application. Optionally, a notification interrupt is generated and delivered to the corresponding logical core of the physical processor.

IRT entry 520 specifies a kernel posted type (KP). Accordingly, if interrupt request 504 is targeting a guest OS kernel running on a virtual CPU in a virtual machine, then interrupt request 504 may be mapped to IRT entry 520 (e.g., based on the handle in the interrupt request 504), and the interrupt request 504 may be processed as a guest kernel interrupt. A KPID pointer 522 is obtained from IRT entry 520 to access KPID 524 and an interrupt vector (indicated in IRT entry 520) is posted in the KPID 524 for the guest OS kernel. Optionally, a notification interrupt is generated and delivered to the corresponding logical core of the physical processor assigned to the virtual machine.

IRT entry 530 specifies a nesting posted type (NP), which indicates the interrupt request is for a guest user application. Accordingly, if interrupt request 504 is targeting a guest user application running on a virtual CPU in a virtual machine, then interrupt request 504 may be mapped to IRT entry 530 (e.g., based on the handle in the interrupt request 504), and the interrupt request 504 may be processed as a guest user application interrupt and use nested posting that includes a first level posting 531 and a second level posting 541.

In first level posting 531, a GUPID pointer 532A is obtained from IRT entry 530 to access GUPID 534, which corresponds to the guest user application targeted by interrupt request 504. An interrupt vector is posted in the GUPID 534. IRT entry 530 identifies the appropriate interrupt vector to post in GUPID 534, and the interrupt remapping hardware (e.g., 160) posts the interrupt vector to GUPID 534, e.g., by setting a bit in GUPID 534 that corresponds to the appropriate interrupt vector.

GUPID 534 can be evaluated to determine whether a notification interrupt needs to be generated to the virtual CPU. If a first bit (e.g., ON field 308) in GUPID 534 indicates that there is no previous interrupt pending, and if a second bit (e.g., SN field 306) in GUPID 534 indicates that the notifications for interrupts are not to be suppressed, then a notification interrupt is to be generated. Typically, a notification interrupt can be generated using the notification vector in the NV field (e.g., NV field 304) and the notification destination in NDST field (e.g., NDST field 302) in a GUPID. In GUPID 534, however, the NDST field may contain an identifier to a virtual CPU on which the guest user application is running. Thus, if a notification interrupt to a virtual CPU is to be generated, the second level posting 541 may be performed.

In second level posting 532, a second pointer referenced as KPIDPT pointer 532B is obtained from IRT entry 530. KPIDPT pointer 532B is used to locate KPID mapping table 540. In at least one embodiment, KPID mapping table 540 can contain multiple KPID pointers (KPIDP) 542(1)-542(n) that reference the locations of respective KPID data structures 544(1)-544(n). The multiple KPID pointers 542(1)-542(n) may be indexed by virtual CPU identifiers vCPU1-vCPUn that correspond respectively to the multiple KPID data structures 544(1)-544(n). Accordingly, the interrupt remapping hardware (e.g., 160) can use the virtual CPU identifier from the NDST field (e.g., NDST field 302) of GUPID 534, to index into KPID mapping table 540 to obtain the location of the corresponding KPID of the virtual CPU. In other embodiments, instead of containing pointers to KPIDs 544(1)-544(n), KPID mapping table 540 may be configured to contain the actual KPID data structures 544(1)-544(n), which may be indexed by the virtual CPU identifiers vCPU1-vCPUn.

For illustration purposes, it will be assumed that KPID 544(1) corresponds to the designated virtual CPU on which the guest user application is running and which is specified by a virtual CPU identifier in the NDST field of GUPID 534. Once KPID 544(1) is located, a corresponding notification interrupt to the designated virtual CPU can be generated. The interrupt remapping hardware (e.g., 160) may use the notification vector from the NV field (e.g., NV field 304) of GUPID 534 to post a notification interrupt in the KPID 544(1), e.g., by setting a bit in KPID 544(1) that corresponds to the appropriate notification interrupt vector.

KPID 544(1) can be evaluated to determine whether another notification interrupt to the logical core corresponding to the designated virtual CPU needs to be generated. If a first bit (e.g., ON field 408) in KPID 544(1) indicates that there is no previous interrupt pending, and if a second bit (e.g., SN field 406) in KPID 544(1) indicates that the notifications for interrupts are not to be suppressed, then a notification interrupt is to be generated for the logical core corresponding to the designated virtual CPU. The interrupt remapping hardware (e.g., 160) may use the notification destination in the NDST field (e.g., NDST field 402) of KPID 544(1) and the notification vector from the NV field (e.g., NV field 404) of KPID 544(1) to generate an ordinary notification interrupt to notify the logical core of the designated physical processor of the pending guest user application interrupts. The notification destination in the NDST field of KPID 544(1) can provide the identifier of the logical core on which the virtual CPU of the targeted guest user application runs. The notification interrupt for the logical core may be generated by sending a message to the logical core using platform specific method.

Figure 6:
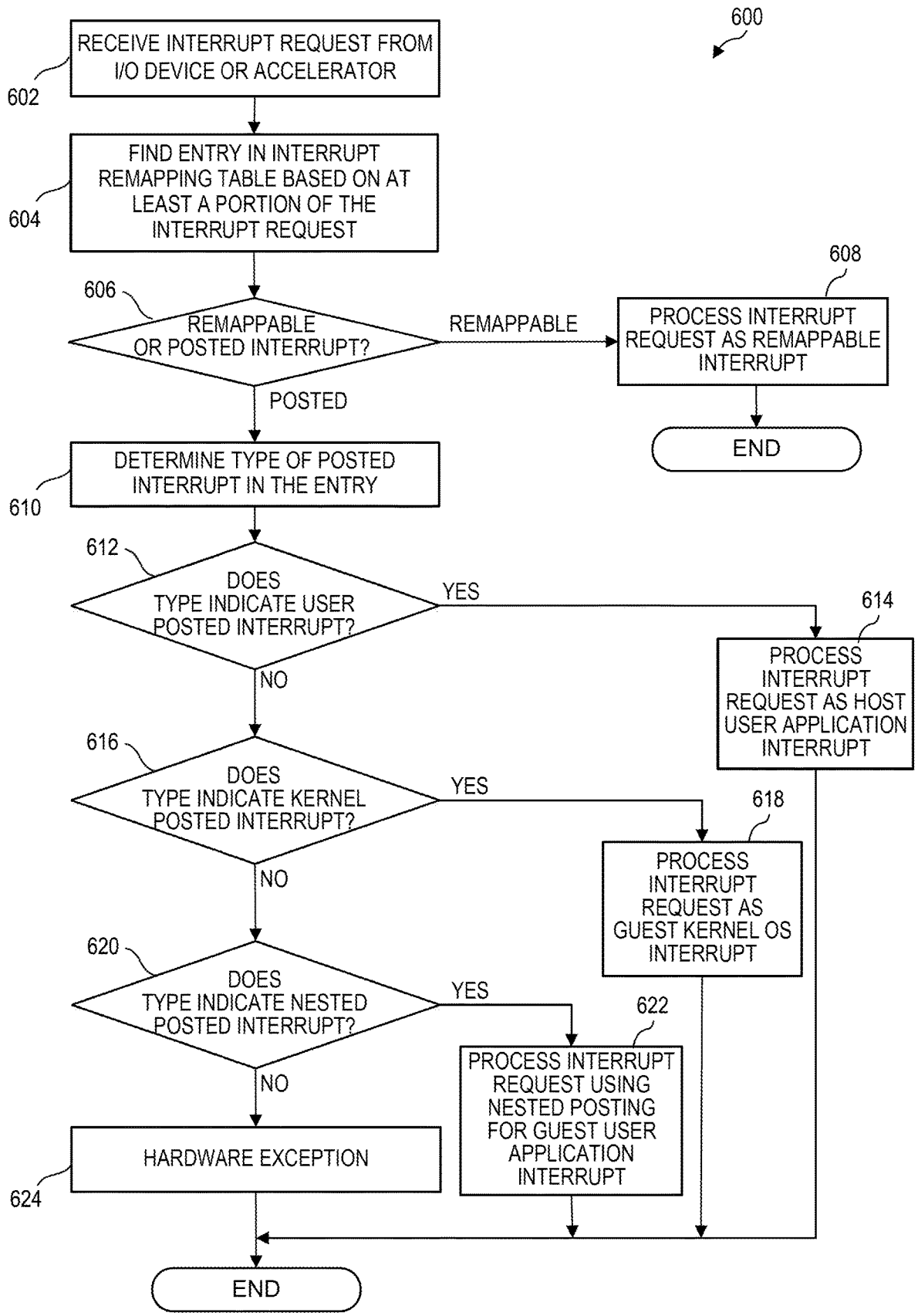
FIG. 6 is a flow diagram of an example process for receiving an interrupt for a user-level application in a virtual machine according to at least one embodiment.

FIG. 6 illustrates a flow diagram of an example process 600 for receiving an interrupt request having a posted format. Process 600 may be performed, for example, by a computing system that comprises any suitable combination of hardware (e.g., circuitry, programmable logic, dedicated logic), firmware (e.g., microcode), and/or software (e.g., instructions that are executable on a machine readable media). Process 600 may be performed on computing system 100, and particularly, on interrupt remapping hardware 160. In one example, least some of the operations of process 600 may be performed by interrupt remapping logic 262. For ease of illustration, references to computing system 100 shown in FIGS. 1-2 may be made when describing process 600.

At 602, an interrupt request is received from external device 170A or 170B, which could be an I/O device or an accelerator, for example.

At 604, an entry in interrupt remapping table 256 is located based on at least a portion of the interrupt request. In one embodiment, a handle in the interrupt request may be used to find the corresponding entry in interrupt remapping table 256.

At 606, a determination is made as to whether the whether the interrupt request is a remappable interrupt or a posted interrupt. If the entry indicates that the interrupt request is a remappable interrupt, then at 608, the interrupt request is processed as a remappable interrupt and may be remapped to the appropriate logical core. If the entry indicates that the interrupt request is a posted interrupt, then the interrupt request is processed as a posted interrupt, for example, as shown at 610-624.

At 610, a posted type of the interrupt request is determined based on a posted type specified in the entry corresponding to the interrupt request. At 612, if the posted type in the entry specifies a user posted (UP) type, then at 614, the interrupt remapping hardware processes the interrupt request as a host user application interrupt. At 616, if the posted type in the entry specifies a kernel posted (KP) type, then at 618, the interrupt remapping hardware processes the interrupt request as a guest kernel OS interrupt. At 620, if the posted type in the entry specifies a nested posting (NP) type, then at 622, the interrupt remapping hardware processes the interrupt request using nested posting for a guest user application interrupt. If the posted type is none of the valid types (e.g., UP, KP, or NP), then at 624, a hardware exception may be raised.

Figure 7:
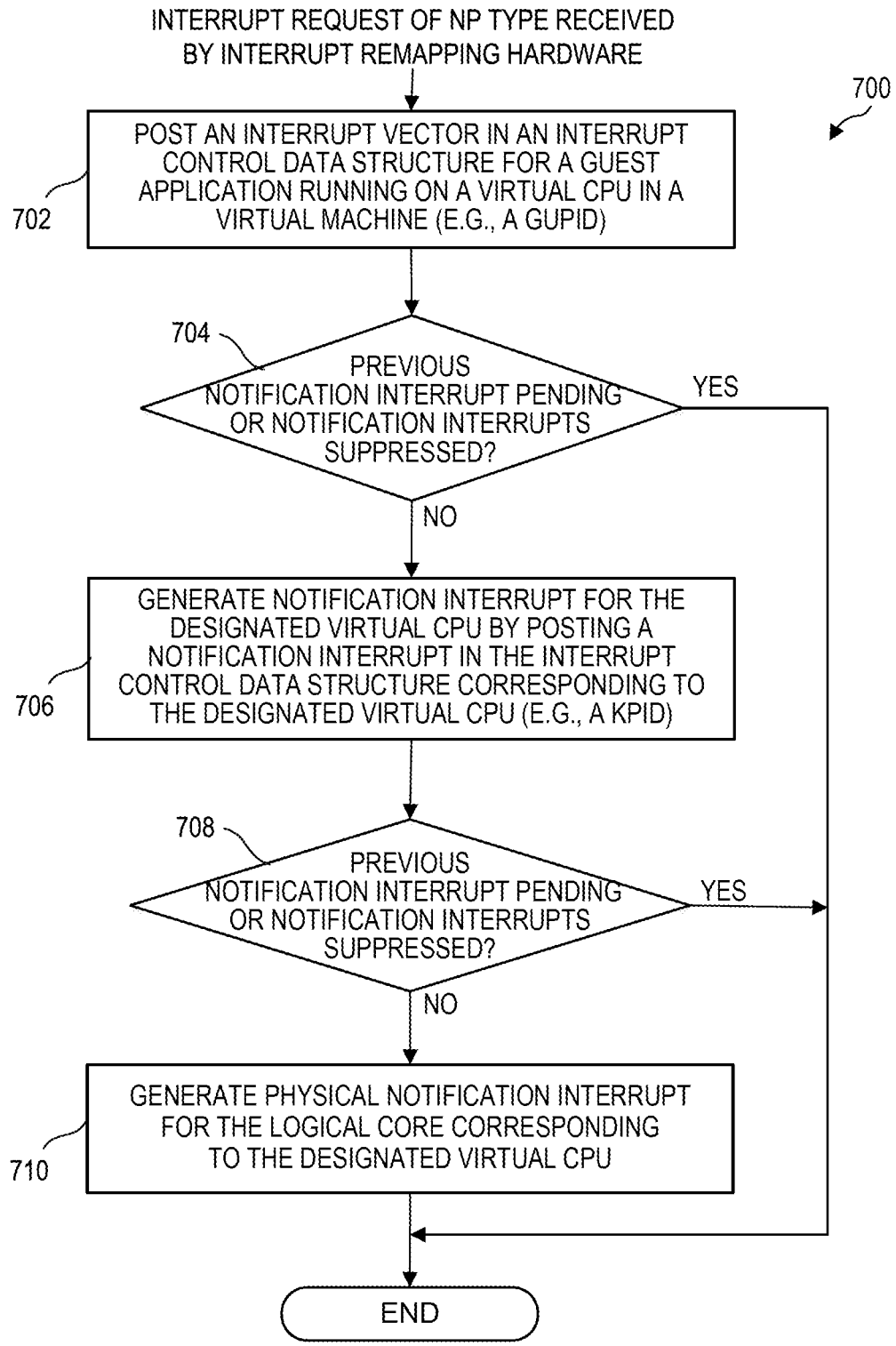
FIG. 7 is a high level flow diagram of an example process for posting an interrupt for a user-level application in a virtual machine according to at least one embodiment.

FIG. 7 illustrates a high-level flow diagram of an example process 700 for performing nested posting for an interrupt request having a nested posting type. Process 700 may be performed, for example, by a computing system that comprises any suitable combination of hardware (e.g., circuitry, programmable logic, dedicated logic), firmware (e.g., microcode), and/or software (e.g., instructions that are executable on a machine readable media). Process 700 may be performed on computing system 100, and particularly, on interrupt remapping hardware 160. In one example, least some of the operations of process 700 may be performed by interrupt posting logic 264 (including nested posting logic 265). Additionally, one or more operations may be performed at 622 of FIG. 6. For ease of illustration, references to computing system 100 shown in FIGS. 1-2 may be made when describing process 700.

Process 700 may begin when an interrupt request has been received by the interrupt remapping hardware 160 and it has been determined that the interrupt request is a nested posting (NP) type, so nested posting is to be used to process the interrupt request. At 702, an interrupt vector for a guest user application running on a designated virtual CPU in a virtual machine may be posted in the interrupt data structure corresponding to the guest user application, such as GUPID 254. The interrupt vector may be indicated in the entry of the interrupt remapping table 256 mapped to the interrupt request, e.g., by a handle in the interrupt request.

At 704, GUPID 254 is evaluated to determine whether a previous notification interrupt for the designated virtual CPU is pending, or whether a notification interrupt for the designated virtual CPU is to be suppressed. This may be determined based on bits (e.g., ON field 308, SN field 306) in the GUPID 254. If a determination is made that either a previous notification interrupt for the designated virtual CPU is pending, or that a notification interrupt for the designated virtual CPU is to be suppressed, then a notification interrupt for the designated virtual CPU is not generated and the flow ends.

At 704, if a determination is made that there is no previous notification interrupt for the designated virtual CPU that is pending, and that a notification interrupt for the designated virtual CPU is not to be suppressed, then at 706, a notification interrupt is generated for the designated virtual CPU running the guest user application in the virtual machine. The notification interrupt is generated by locating an interrupt data structure corresponding to the virtual CPU, such as KPID 253. To locate KPID 253, a virtual CPU identifier of the designated virtual CPU may be obtained from GUPID 254 and used as an index into KPID mapping table 258. A notification vector may also be obtained from GUPID 254 and used to post a notification interrupt in KPID 253.

At 708, KPID 253 is evaluated to determine whether a previous notification interrupt for a logical core corresponding to the designated virtual CPU is pending, or whether a notification interrupt for the logical core is to be suppressed. This may be determined based on bits (e.g., ON field 408, SN field 406) in KPID 253. If a determination is made that either a previous notification interrupt for the logical core is pending, or that a notification interrupt for the logical core is to be suppressed, then a notification interrupt for the logical core is not generated and the flow ends.

At 710, if a determination is made that there is no previous notification interrupt that is pending for the logical core corresponding to the designated virtual CPU, and that a notification interrupt for the logical core is not to be suppressed, then at 712, a physical notification interrupt is generated for the logical core on which the designated virtual CPU is running. The physical notification interrupt is generated by using an identifier of the logical core obtained from KPID 253 and a physical notification vector that may also be obtained from KPID 253.

Figure 8:
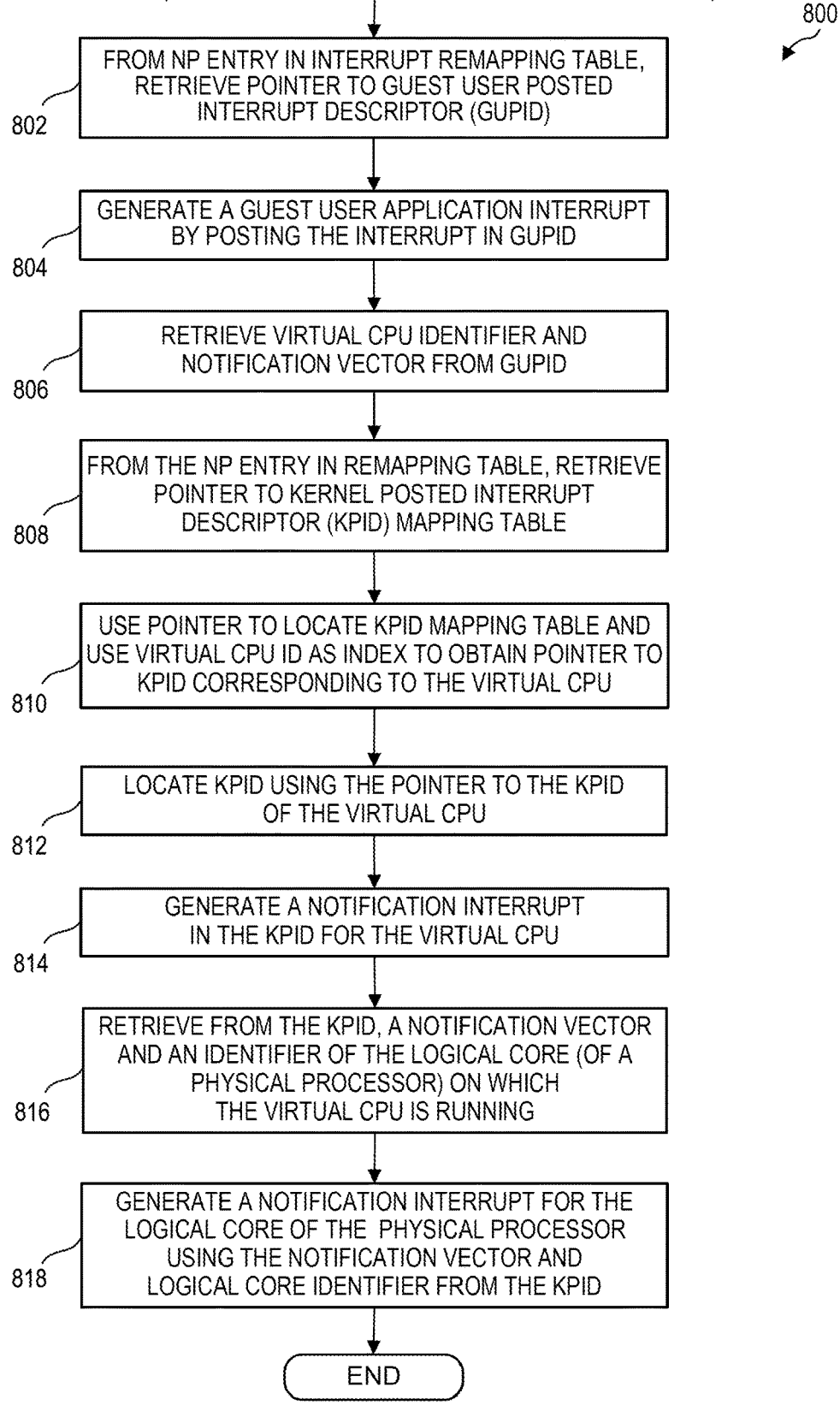
FIG. 8 is a flow diagram showing additional details of an example process for posting an interrupt for a user-level application in a virtual machine according to at least one embodiment.

FIG. 8 illustrates a more detailed flow diagram of an example process 800 for performing nested posting for an interrupt request having a nested posting type. Process 800 may be performed, for example, by a computing system that comprises any suitable combination of hardware (e.g., circuitry, programmable logic, dedicated logic), firmware (e.g., microcode), and/or software (e.g., instructions that are executable on a machine readable media). Process 800 may be performed on computing system 100, for example, by interrupt remapping hardware 160. In one example, least some of the operations of process 800 may be performed by nested posting logic 265 in the interrupt posting logic 264. Additionally, one or more operations may be performed at 622 of FIG. 6. For ease of illustration, references to computing system 100 shown in FIGS. 1-2 may be made when describing process 800.

Process 800 may begin after an interrupt request has been received by the interrupt remapping hardware 160, a corresponding entry in interrupt remapping table 256 has been identified, and a determination that the interrupt request is a nested posting (NP) type has been made. Accordingly, one or more operations related to nested posting as disclosed herein are performed in process 800. For ease of explanation only, it is assumed that all notification interrupts are to be generated for the interrupt request received in process 800. Additionally, for clarity, process 800 will be described with reference to an interrupt request targeting guest user application 114A in virtual machine 110A, which includes virtual CPU 112A, and virtual CPU 112A corresponds to (or runs on) logical core 142A of physical processor 140.

At 802, a first pointer to an interrupt data structure for guest user application 114A targeted by the interrupt request is retrieved from the entry in interrupt remapping table 256 that corresponds to the interrupt request. The first pointer is used to locate the interrupt data structure for the guest user application 114A, which is GUPID 254 in this example.

At 804, a guest user application interrupt for guest user application 114A can be generated. The guest user application interrupt can be generated by posting an interrupt for the guest user application 114A in GUPID 254, e.g., by setting a bit in GUPID 254 that corresponds to the appropriate interrupt vector. The interrupt vector may be specified in the entry in interrupt remapping table 256 that corresponds to the interrupt request.

At 806, a virtual CPU identifier of the virtual CPU 112A on which the guest user application 114A is running in the virtual machine is retrieved from GUPID 254. In addition, a notification vector may be retrieved from GUPID 254.

At 808, a second pointer to KPID mapping table 258 containing locations (e.g., pointers or actual data structures) of interrupt data structures associated with virtual CPUs, such as KPID 253, is retrieved from the entry in interrupt remapping table 256 that corresponds to the interrupt request.

At 810, the second pointer is used to locate KPID mapping table 258. The virtual CPU identifier retrieved from GUPID 254, may be used to index KPID mapping table 258 to obtain a pointer to a corresponding KPID data structure, or to obtain the corresponding KPID itself from the KPID mapping table, depending on the implementation. If a KPID pointer is obtained from KPID mapping table 258, then at 812, the KPID pointer is used to locate a KPID corresponding to the virtual CPU 112A whose identifier was used as the index into the KPID mapping table.

At 814, a notification interrupt for the virtual CPU 112A can be generated. The notification interrupt for the virtual CPU can be generated by using the notification vector from GUPID 254 to post a notification interrupt in KPID 253, e.g., by setting a bit in KPID 253 that corresponds to the appropriate notification interrupt vector.

At 816, an identifier of logical core 142A of physical processor 140 on which the virtual CPU 112A is running may be retrieved from KPID 253, for example, from a notification destination field. Also, a notification vector may also be retrieved from KPID 253, for example, from a notification vector field.

At 818, a notification interrupt is for the logical core 142A of physical processor 140 can be generated to notify the logical core of the pending guest user application interrupt. The notification interrupt can be generated using the identifier of the logical core 142A and the notification vector obtained from KPID 253. In at least one example, the notification interrupt for the logical core may be generated by sending a message (e.g., based on the notification vector obtained from the KPID) to the logical core (e.g., based on the identifier of the logical core obtained from the KPID) using a platform specific method.

Figure 9:
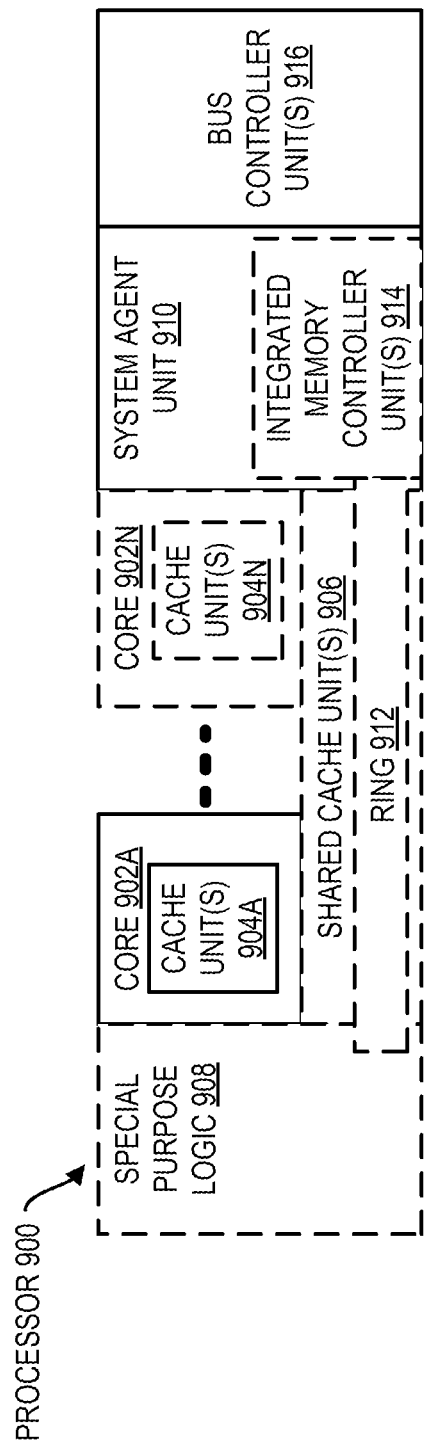
FIG. 9 is a block diagram of a processor that may have more than one core, may have an integrated memory controller, and may have integrated graphics according to embodiments of the present disclosure.

FIG. 9 is a block diagram of a processor 900 that may have more than one core, may have an integrated memory controller, and may have integrated graphics according to one or more embodiments of this disclosure. Processor 900 is an example of a type of hardware device that can be used in connection with the implementations shown and described herein (e.g., processor 140). The solid lined boxes in FIG. 9 illustrate a processor 900 with a single core 902A, a system agent unit 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908. Processor 900 and its components (e.g., cores 902A-N, cache unit(s) 904A-N, shared cache unit(s) 906, etc.) represent example architecture that could be used to implement processor 140 and at least some of their respective components.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of executing the same instruction set, while others may be capable of executing only a subset of that instruction set or a different instruction set.

Figure 11:
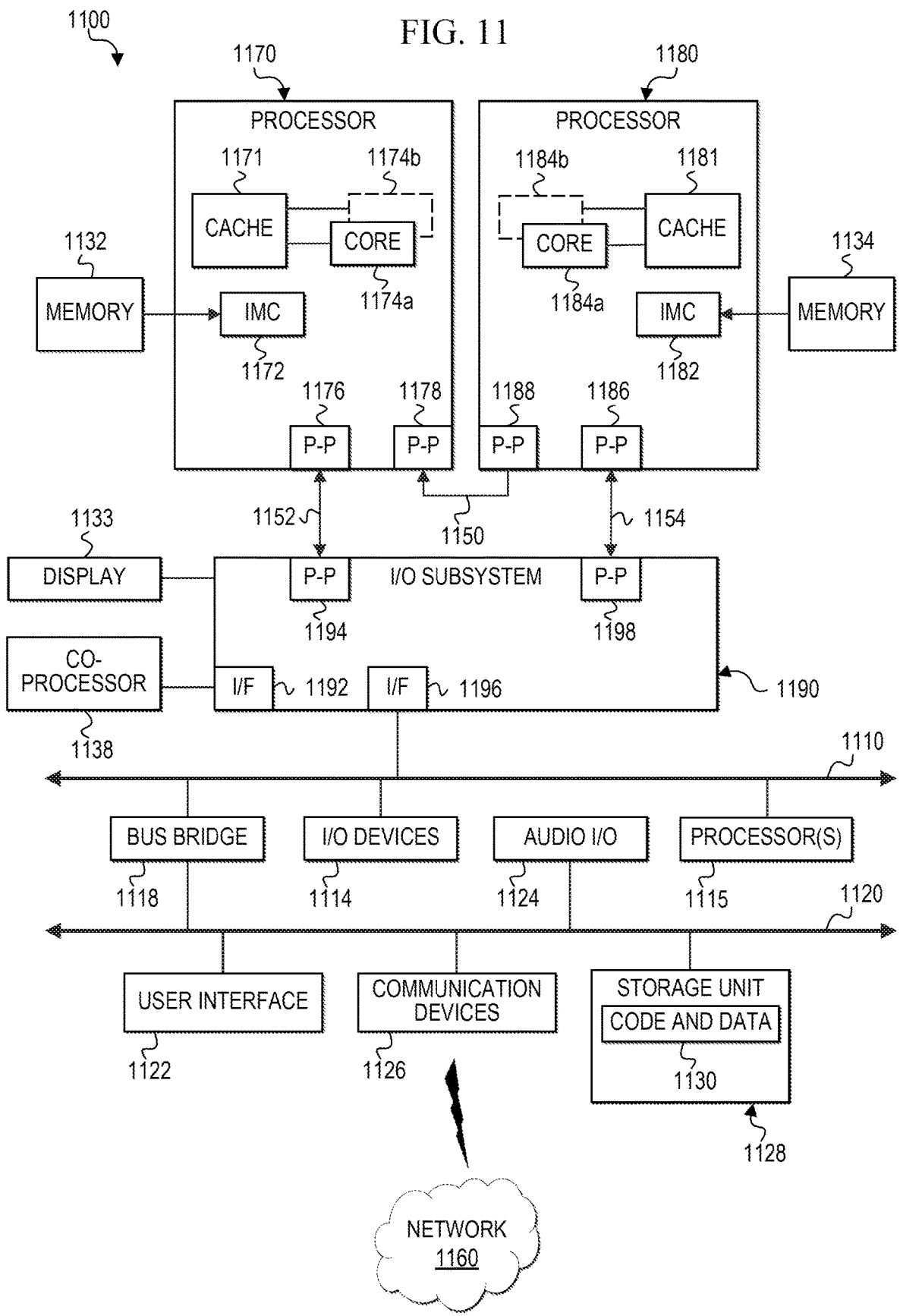
FIG. 11 is a block diagram of an example computer architecture according to at least one embodiment.
Figure 12:
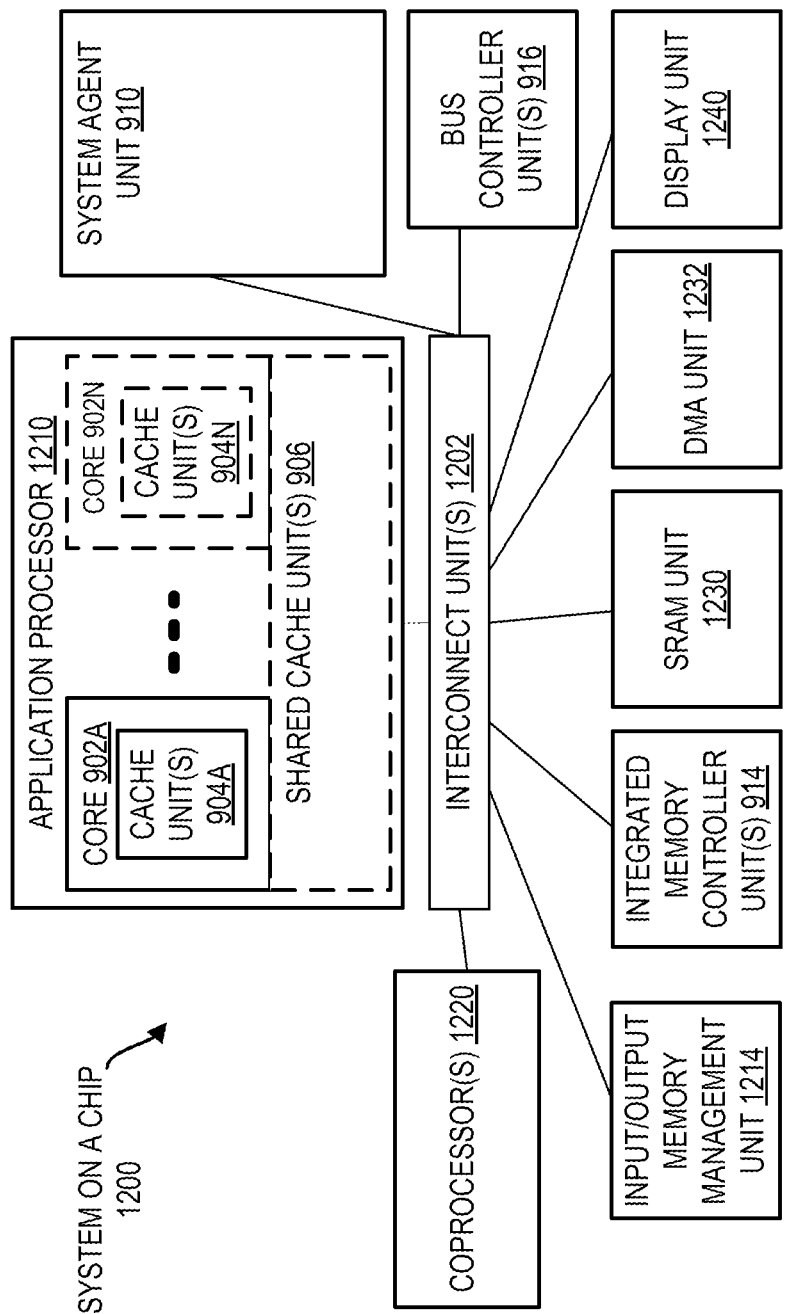
FIG. 12 is a block diagram of an example computer architecture for a system-on-a-chip according to at least one embodiment.

FIGS. 10-12 described below detail exemplary architectures and systems to implement embodiments of the nested posting described above. In some embodiments, one or more hardware components and/or instructions described above are emulated as detailed below or implemented as software modules. Other computer architecture designs known in the art for processors, mobile devices, computing systems, and components thereof may also (or alternatively) be used. Generally, suitable computer architectures for embodiments disclosed (e.g., computing system 100, processor 140, logical cores 142A-142D, IOMMU 162, interrupt remapping hardware 160, memory 150, etc.) herein can include, but are not limited to, configurations illustrated in the below FIGS. 10-12.

FIG. 10A is a block diagram illustrating both an exemplary in-order pipeline and an exemplary register renaming, out-of-order issue/execution pipeline according to one or more embodiments of this disclosure. FIG. 10B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 930 coupled to an execution engine unit 1050, and both are coupled to a memory unit 1070. Processor core 1090 and memory unit 1070 are examples of the types of hardware that can be used in connection with the implementations shown and described herein (e.g., logical cores 142A-142D, memory 150). The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like. In addition, processor core 1090 and its components represent example architecture that could be used to implement logical processors and at least some of their respective components.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the scheduling stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing systems or computing devices described herein (e.g., computing system 100) may be configured in the same or similar manner as computing system 1100 with appropriate hardware, firmware, and/or software to implement interrupt posting features, including nested posting, as disclosed herein.

Processors 1170 and 1180 may be implemented as single core processors 1174a and 1184a or multi-core processors 1174a-1174b and 1184a-1184b. Processors 1170 and 1180 may each include a cache 1171 and 1181 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1100. Moreover, processors 1170 and 1180 are examples of the types of hardware that can be used in connection with the implementations shown and described herein (e.g., processor 140).

Processors 1170 and 1180 may also each include integrated memory controller logic (MC) 1172 and 1182 to communicate with memory elements 1132 and 1134, which may be portions of main memory locally attached to the respective processors. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures.

Processors 1170 and 1180 may exchange data via a point-to-point (PtP) interface 1150 using point-to-point interface circuits 1178 and 1188, respectively. Processors 1170 and 1180 may each exchange data with an input/output (I/O) subsystem 1190 via individual point-to-point interfaces 1152 and 1154 using point-to-point interface circuits 1176, 1186, 1194, and 1198. I/O subsystem 1190 may also exchange data with a high-performance graphics circuit 1138 via a high-performance graphics interface 1139, using an interface circuit 1192, which could be a PtP interface circuit. In one embodiment, the high-performance graphics circuit 1138 is a special-purpose processor, such as, for example, a high-throughput MIC processor, a network or communication processor, compression engine, graphics processor, GPGPU, embedded processor, or the like. I/O subsystem 1190 may also communicate with a display 1133 for displaying data that is viewable by a human user. In alternative embodiments, any or all of the PtP links illustrated in FIG. 11 could be implemented as a multi-drop bus rather than a PtP link.

I/O subsystem 1190 may be in communication with a bus 1110 via an interface circuit 1196. Bus 1110 may have one or more devices that communicate over it, such as a bus bridge 1118, I/O devices 1114, and one or more other processors 1115. Via a bus 1120, bus bridge 1118 may be in communication with other devices such as a user interface 1122 (such as a keyboard, mouse, touchscreen, or other input devices), communication devices 1126 (such as modems, network interface devices, or other types of communication devices that may communicate through a computer network 1160), audio I/O devices 1124, and/or a data storage device 1128. Data storage device 1128 may store code and data 1130, which may be executed by processors 1170 and/or 1180. In alternative embodiments, any portions of the bus architectures could be implemented with one or more PtP links.

Program code, such as code 1130, may be applied to input instructions to perform the functions described herein and generate output information. The output information may be applied to one or more output devices, in known fashion. For purposes of this application, a processing system may be part of computing system 1100 and includes any system that has a processor, such as, for example; a digital signal processor (DSP), a microcontroller, an application specific integrated circuit (ASIC), or a microprocessor.

The program code (e.g., 1130) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Referring now to FIG. 12, shown is a block diagram of a system-on-a-chip (SoC) 1200 in accordance with at least one embodiment of the present disclosure. Also, dashed lined boxes are optional features on more advanced SoCs. In FIG. 12, an interconnect unit(s) 1202 is coupled to: an application processor 1210 which includes a set of one or more cores 902A-N and shared cache unit(s) 906; a system agent unit 910; a bus controller unit(s) 916; an integrated memory controller unit(s) 914; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. The interconnect unit(s) 1202 may also be coupled to an input/output memory management unit (IOMMU) 1214, which may be configured in the same or similar manner as IOMMU 162 with interrupt remapping hardware 160 of computing system 100. In one embodiment, the coprocessor(s) 1220 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

Other Notes and Examples

The following examples pertain to embodiments in accordance with this specification. The system, apparatus, method, and machine readable storage medium embodiments can include one or a combination of the following examples.

Example S1 provides a system comprising a physical processor including a logical core, the physical processor to execute a virtual machine manager to run a virtual machine on the logical core. The virtual machine to include a guest user application and a virtual central processing unit (CPU). The system further comprises circuitry communicatively coupled to an external device. The circuitry is to receive an interrupt request from the external device for the guest user application, locate a first interrupt data structure associated with the guest user application, generate a first interrupt with the first interrupt data structure based on a first interrupt vector associated with the interrupt request, locate a second interrupt data structure associated with the virtual CPU, and generate a first notification interrupt for the virtual CPU with the second interrupt data structure based on a first notification vector in the first interrupt data structure.

Example S2 comprises the subject matter of Example S1, and the circuitry is further to generate a second notification interrupt for the logical core of the physical processor using a second notification vector and a first identifier of the logical core.

Example S3 comprises the subject matter of Example S2, and the circuitry is further to obtain the second notification vector and the first identifier of the logical core from the second interrupt data structure.

Example S3.5 comprises the subject matter of any one of Examples S2-S3, and to generate the second notification interrupt for the logical core is to send a message to the logical core using the second notification vector and the first identifier of the logical core.

Example S4 comprises the subject matter of any one of Examples S1-S3.5, and the circuitry is further to obtain a virtual CPU identifier of the virtual CPU from the first interrupt data structure, locate an interrupt data structure mapping table that associates a plurality of virtual CPU identifiers to a plurality of second interrupt data structures, respectively, and access the interrupt data structure mapping table using the virtual CPU identifier to locate the second interrupt data structure of the plurality of second interrupt data structures.

Example S4.5 comprises the subject matter of any one of Examples S1-S3, and the circuitry is further to obtain a virtual CPU identifier of the virtual CPU from the first interrupt data structure, locate an interrupt data structure mapping table that associates a plurality of virtual CPU identifiers to a plurality of pointers to respective second interrupt data structures, respectively, and access the interrupt data structure mapping table using the virtual CPU identifier to locate a pointer to the second interrupt data structure.

Example S5 comprises the subject matter of any one of Examples S1-S4.5, and the circuitry is further to identify, in an interrupt remapping table, an entry corresponding to the interrupt request from the external device and obtain, from the entry, a first pointer to the first interrupt data structure, a second pointer to the interrupt data structure mapping table, and the first interrupt vector.

Example S6 comprises the subject matter of any one of Examples S1-S5, and the circuitry is further to determine whether a posted type associated with the interrupt request is a user-level posted type, a kernel posted type, or a nested posted type.

Example S7 comprises the subject matter of any one of Examples S1-S6, and the circuitry is further to, subsequent to receiving the interrupt request, receive a second interrupt request for the guest user application, locate the first interrupt data structure associated with the guest user application, and in response to determining that a previous notification interrupt for the virtual CPU is pending, prevent generating another notification interrupt for the virtual CPU.

Example S8 comprises the subject matter of any one of Examples S1-S7, and the circuitry is further to, in response to determining that a previous notification interrupt for the logical core of the physical processor is pending, prevent generation of a second notification interrupt for the logical core of the physical processor.

Example S9 comprises the subject matter of any one of Examples S1-S8, and the external device is one of an input/output device or an accelerator.

Example S10 comprises the subject matter of any one of Examples S1-S9, and the physical processor and the circuitry are part of a hardware platform, and the external device is either integrated with the hardware platform or separate from the hardware platform Example A1 provides an apparatus comprising interrupt remapping hardware including circuitry to be communicatively coupled to an external device and a physical processor including a logical core. The circuitry is to receive an interrupt request from the external device for a guest user application running on a virtual central processing unit (CPU) in a virtual machine instantiated by a virtual machine manager (VMM) executed by the physical processor, locate a first interrupt data structure associated with the guest user application, generate a first interrupt with the first interrupt data structure based on a first interrupt vector associated with the interrupt request, locate a second interrupt data structure associated with the virtual CPU, and generate a first notification interrupt for the virtual CPU with the second interrupt data structure based on a first notification vector in the first interrupt data structure.

Example A2 comprises the subject matter of Example A1, and the circuitry is further to generate a second notification interrupt for the logical core of the physical processor using a second notification vector and a first identifier of the logical core.

Example A3 comprises the subject matter of Example A2, and the circuitry is further to obtain the second notification vector and the first identifier of the logical core from the second interrupt data structure.

Example A3.5 comprises the subject matter of any one of Examples A2-A3, and to generate the second notification interrupt for the logical core is to send a message to the logical core using the second notification vector and the first identifier of the logical core.

Example A4 comprises the subject matter of any one of Examples A1-A3.5, and the circuitry is further to obtain a virtual CPU identifier of the virtual CPU from the first interrupt data structure, locate an interrupt data structure mapping table that associates a plurality of virtual CPU identifiers to a plurality of second interrupt data structures, respectively, and access the interrupt data structure mapping table using the virtual CPU identifier to locate the second interrupt data structure of the plurality of second interrupt data structures.

Example A4.5 comprises the subject matter of any one of Examples A1-A3, and the circuitry is further to obtain a virtual CPU identifier of the virtual CPU from the first interrupt data structure, locate an interrupt data structure mapping table that associates a plurality of virtual CPU identifiers to a plurality of pointers to respective second interrupt data structures, respectively, and access the interrupt data structure mapping table using the virtual CPU identifier to locate a pointer to the second interrupt data structure.

Example A5 comprises the subject matter of any one of Examples A1-A4.5, and the circuitry is further to identify, in an interrupt remapping table, an entry corresponding to the interrupt request from the external device and obtain, from the entry, a first pointer to the first interrupt data structure, a second pointer to the interrupt data structure mapping table, and the first interrupt vector.

Example A6 comprises the subject matter of any one of Examples A1-A5, and the circuitry is further to determine whether a posted type associated with the interrupt request is a user-level posted type, a kernel posted type, or a nested posted type.

Example A7 comprises the subject matter of any one of Examples A1-A6, and the circuitry is further to, subsequent to receiving the interrupt request, receive a second interrupt request for the guest user application, locate the first interrupt data structure associated with the guest user application, and in response to determining that a previous notification interrupt for the virtual CPU is pending, prevent generating another notification interrupt for the virtual CPU.

Example A8 comprises the subject matter of any one of Examples A1 or A4-A7, and the circuitry is further to, in response to determining that a previous notification interrupt for the logical core of the physical processor is pending, prevent generation of a second notification interrupt for the logical core of the physical processor.

Example A9 comprises the subject matter of any one of Examples A1-A8, and the external device is one of an input/output device or an accelerator.

Example A10 comprises the subject matter of any one of Examples A1-A9, and the physical processor and the circuitry are configured to be part of a hardware platform, and the external device is configured to either be integrated with the hardware platform or separate from the hardware platform.

Example M1 provides a method comprising receiving, by circuitry in a hardware platform, an interrupt request from an external device communicatively coupled to the circuitry, and the interrupt request targets a guest user application running on a virtual central processing unit (CPU) in a virtual machine corresponding to a logical core of a physical processor in the hardware platform. The method further comprises locating a first interrupt data structure associated with the guest user application, generating a first interrupt via the first interrupt data structure based on a first interrupt vector associated with the interrupt request, locating a second interrupt data structure associated with the virtual CPU, and generating a first notification interrupt via the second interrupt data structure based on a first notification vector in the first interrupt data structure.

Example M2 comprises the subject matter of Example M1, and further comprises generating a second notification interrupt for the logical core of the physical processor using a second notification vector and a first identifier of the logical core.

Example M3 comprises the subject matter of Example M2, and further comprises obtaining the second notification vector and the first identifier of the logical core from the second interrupt data structure.

Example M3.5 comprises the subject matter of any one of Examples M2-M3, and the generating the second notification interrupt for the logical core includes sending a message to the logical core using the second notification vector and the first identifier of the logical core.

Example M4 comprises the subject matter of any one of Examples M1-M3.5, and further comprises obtaining a virtual CPU identifier of the virtual CPU from the first interrupt data structure, locating an interrupt data structure mapping table that associates a plurality of virtual CPU identifiers to a plurality of second interrupt data structures, respectively, and accessing the interrupt data structure mapping table using the virtual CPU identifier to locate the second interrupt data structure of the plurality of second interrupt data structures.

Example M4.5 comprises the subject matter of any one of Examples M1-M3, and further comprises obtaining a virtual CPU identifier of the virtual CPU from the first interrupt data structure, locating an interrupt data structure mapping table that associates a plurality of virtual CPU identifiers to a plurality of pointers to respective second interrupt data structures, respectively, and accessing the interrupt data structure mapping table using the virtual CPU identifier to locate a pointer to the second interrupt data structure.

Example M5 comprises the subject matter of any one of Examples M1-M4.5, and further comprises identifying, in an interrupt remapping table, an entry corresponding to the interrupt request from the external device and obtaining, from the entry, a first pointer to the first interrupt data structure, a second pointer to the interrupt data structure mapping table, and the first interrupt vector.

Example M6 comprises the subject matter of any one of Examples M1-M5, and further comprises determining whether a posted type associated with the interrupt request is a user-level posted type, a kernel posted type, or a nested posted type.

Example M7 comprises the subject matter of any one of Examples M1-M6, and further comprises, subsequent to receiving the interrupt request, receiving a second interrupt request for the guest user application, locating the first interrupt data structure associated with the guest user application, and in response to determining that a previous notification interrupt for the virtual CPU is pending, preventing generating another notification interrupt for the virtual CPU.

Example M8 comprises the subject matter of any one of Examples M1 or M4-M7, and further comprises, in response to determining that a previous notification interrupt for the logical core of the physical processor is pending, preventing generation of a second notification interrupt for the logical core of the physical processor.

Example M9 comprises the subject matter of any one of Examples M1-M8, and the external device is one of an input/output device or an accelerator.

Example M10 comprises the subject matter of any one of Examples M1-M9, and the external device is either integrated with the hardware platform or separate from the hardware platform.

Example C1 provides one or more machine readable storage media comprising instructions stored thereon. When executed by a machine, the instructions cause the machine to receive an interrupt request from an external device coupled to a hardware platform, wherein the interrupt request targets a guest user application running on a virtual central processing unit (CPU) in a virtual machine corresponding to a logical core of a physical processor in the hardware platform, locate a first interrupt data structure associated with the guest user application, generate a first interrupt via the first interrupt data structure based on a first interrupt vector associated with the interrupt request, locate a second interrupt data structure associated with the virtual CPU, and generate a first notification interrupt for the virtual CPU with the second interrupt data structure based on a first notification vector in the first interrupt data structure.

Example C2 comprises the subject matter of Example C1, and the instructions when executed by the machine are to cause the machine further to generate a second notification interrupt for the logical core of the physical processor using a second notification vector and a first identifier of the logical core.

Example C3 comprises the subject matter of Example C2, and the instructions when executed by the machine are to cause the machine further to obtain the second notification vector and the first identifier of the logical core from the second interrupt data structure.

Example C3.5 comprises the subject matter of any one of Examples C2-C3, and to generate the second notification interrupt for the logical core is to send a message to the logical core using the second notification vector and the first identifier of the logical core.

Example C4 comprises the subject matter of any one of Examples C1-C3.5, and the instructions when executed by the machine are to cause the machine further to obtain a virtual CPU identifier of the virtual CPU from the first interrupt data structure, locate an interrupt data structure mapping table that associates a plurality of virtual CPU identifiers to a plurality of second interrupt data structures, respectively, and access the interrupt data structure mapping table using the virtual CPU identifier to locate the second interrupt data structure of the plurality of second interrupt data structures.

Example C4.5 comprises the subject matter of any one of Examples C1-C3, and the instructions when executed by the machine are to cause the machine further obtain a virtual CPU identifier of the virtual CPU from the first interrupt data structure, locate an interrupt data structure mapping table that associates a plurality of virtual CPU identifiers to a plurality of pointers to respective second interrupt data structures, respectively, and access the interrupt data structure mapping table using the virtual CPU identifier to locate a pointer to the second interrupt data structure.

Example C5 comprises the subject matter of any one of Examples C1-C4.5, and the instructions when executed by the machine are to cause the machine further to identify, in an interrupt remapping table, an entry corresponding to the interrupt request from the external device; and obtain, from the entry, a first pointer to the first interrupt data structure, a second pointer to the interrupt data structure mapping table, and the first interrupt vector.

Example C6 comprises the subject matter of any one of Examples C1-C5, and the instructions when executed by the machine are to cause the machine further to determine whether a posted type associated with the interrupt request is a user-level posted type, a kernel posted type, or a nested posted type.

Example C7 comprises the subject matter of any one of Examples C1-C6, and the instructions when executed by the machine are to cause the machine further to, subsequent to receiving the interrupt request, receive a second interrupt request for the guest user application, locate the first interrupt data structure associated with the guest user application, and in response to determining that a previous notification interrupt for the virtual CPU is pending, prevent generating another notification interrupt for the virtual CPU.

Example C8 comprises the subject matter of any one of Examples C1 or C4-C7, and the instructions when executed by the machine are to cause the machine further to, in response to determining that a previous notification interrupt for the logical core of the physical processor is pending, prevent generation of a second notification interrupt for the logical core of the physical processor.

Example C9 comprises the subject matter of any one of Examples C1-C8, and the external device is one of an input/output device or an accelerator.

Example C10 comprises the subject matter of any one of Examples C1-C9, and the external device is either integrated with the hardware platform or separate from the hardware platform.

Example X1 provides an apparatus comprising means for performing the method of any one of Examples M1-M10.

Example X2 comprises the subject matter of Example X1 and the means for performing the method comprises interrupt remapping hardware and at least one memory element.

Example X3 comprises the subject matter of Example X2 and the at least one memory element comprises machine readable instructions that when executed, cause the apparatus to perform the method of any one of Examples M1-M10.

Example X4 comprises the subject matter of any one of Examples X1-X3 and the apparatus is one of a computing system or a system-on-a-chip.

The invention claimed is:
1. A system comprising:
a physical processor including a logical core, the physical processor to execute a virtual machine manager to run a virtual machine on the logical core, the virtual machine including a guest user application and a virtual central processing unit (CPU);
memory to store a first interrupt data structure associated with the guest user application and a second interrupt data structure associated with the virtual CPU; and
circuitry communicatively coupled to an external device, the circuitry to:
identify, in a first table, an entry corresponding to an interrupt request received from the external device for the guest user application, wherein the entry includes a first interrupt vector for the guest user application;
obtain, from the entry, the first interrupt vector, a first pointer to the first interrupt data structure, and a second pointer to a second table that associates the first identifier of the virtual CPU to the second interrupt data structure;
locate, based on first information in the entry, the first interrupt data structure including a first notification vector for the virtual CPU and a first identifier of the virtual CPU;
generate a first interrupt for the guest user application with the first interrupt data structure based on the first interrupt vector;
locate the second interrupt data structure based at least in part on second information in the entry and the first identifier of the virtual CPU; and generate a first notification interrupt for the virtual CPU with the second interrupt data structure based on the first notification vector for the virtual CPU.

2. The system of claim 1, wherein the circuitry is further to:
generate a second notification interrupt for the logical core of the physical processor using a second notification vector and a second identifier of the logical core.

3. The system of claim 2, wherein the circuitry is further to:
obtain the second notification vector and the second identifier of the logical core from the second interrupt data structure.

4. The system of claim 1, wherein the circuitry is further to:
obtain the first identifier of the virtual CPU from the first interrupt data structure;
locate a second table that associates a plurality of virtual CPU identifiers to a plurality of second interrupt data structures, respectively; and
access the second table using the first identifier to locate the second interrupt data structure of the plurality of second interrupt data structures.

5. The system of claim 1, wherein the circuitry is further to:
determine whether a posted type associated with the interrupt request is a user-level posted type, a kernel posted type, or a nested posted type.

6. The system of claim 1, wherein the circuitry is further to:
subsequent to receiving the interrupt request, receive a second interrupt request for the guest user application;
locate the first interrupt data structure associated with the guest user application; and
in response to determining that a previous notification interrupt for the virtual CPU is pending, prevent generating another notification interrupt for the virtual CPU.

7. The system of claim 1, wherein the circuitry is further to:
in response to determining that a previous notification interrupt for the logical core of the physical processor is pending, prevent generation of a second notification interrupt for the logical core of the physical processor.

8. The system of claim 1, wherein the external device is one of an input/output device or an accelerator.

9. The system of claim 1, wherein the physical processor and the circuitry are part of a hardware platform, and wherein the external device is either integrated with the hardware platform or separate from the hardware platform.

10. An apparatus comprising:
interrupt remapping hardware including circuitry communicatively coupled to an external device and a physical processor including a logical core, the circuitry to:
receive an interrupt request from the external device for a guest user application running on a virtual central processing unit (CPU) in a virtual machine instantiated by a virtual machine manager (VMM) executed by the physical processor;
identify, in a first table, an entry corresponding to the interrupt request and including a first interrupt vector for the guest user application;
obtain, from the entry, the first interrupt vector, a first pointer to a first interrupt data structure, and a second pointer to a second table that associates the first identifier of the virtual CPU to the second interrupt data structure;

use first information in the entry to locate the first interrupt data structure in memory, wherein the first interrupt data structure includes a first notification vector for the virtual CPU and a first identifier of the virtual CPU;
generate a first interrupt for the guest user application by setting a first portion of the first interrupt data structure based on the first interrupt vector;
use second information in the entry and the first identifier of the virtual CPU to locate a second interrupt data structure in the memory; and
generate a first notification interrupt for the virtual CPU by setting a second portion of the second interrupt data structure based on the first notification vector for the virtual CPU.

11. The apparatus of claim 10, wherein the circuitry is further to:
generate a second notification interrupt for the logical core of the physical processor using a second notification vector and a second identifier of the logical core.

12. The apparatus of claim 11, wherein the circuitry is further to:
obtain the second notification vector and the second identifier of the logical core from the second interrupt data structure.

13. The apparatus of claim 10, wherein the circuitry is further to:
obtain the first identifier of the virtual CPU from the first interrupt data structure;
locate a second table that associates a plurality of virtual CPU identifiers to a plurality of second interrupt data structures, respectively; and
access the second table using the first identifier to locate the second interrupt data structure of the plurality of second interrupt data structures.

14. The apparatus of claim 10, wherein the circuitry is further to:
determine whether a posted type associated with the interrupt request is a user-level posted type, a kernel posted type, or a nested posted type.

15. The apparatus of claim 10, wherein the circuitry is further to:
in response to determining that notification interrupts are to be suppressed for the logical core of the physical processor, prevent generation of a second notification interrupt for the logical core of the physical processor.

16. A method comprising:
receiving, by circuitry in a hardware platform, an interrupt request from an external device communicatively coupled to the circuitry, wherein the interrupt request targets a guest user application running on a virtual central processing unit (CPU) in a virtual machine corresponding to a logical core of a physical processor in the hardware platform;
identifying, in a first table, an entry corresponding to the interrupt request and including a first interrupt vector for the guest user application;
obtaining, from the entry, the first interrupt vector, a first pointer to a first interrupt data structure, and a second pointer to a second table that associates the first identifier of the virtual CPU to the second interrupt data structure;
using a first pointer in the entry to locate first interrupt data structure in memory, wherein the first interrupt data structure includes a first notification vector for the virtual CPU and a first identifier of the virtual CPU;

generating a first interrupt for the guest user application via the first interrupt data structure based on the first interrupt vector;

using a second pointer in the entry in the first table and the first identifier of the virtual CPU to locate a second interrupt data structure in the memory; and generating a first notification interrupt for the virtual CPU via the second interrupt data structure based on the first notification vector for the virtual CPU.

17. The method of claim 16, further comprising:

obtaining a second notification vector and a second identifier of the logical core from the second interrupt data structure; and generating a second notification interrupt for the logical core of the physical processor using the second notification vector and the second identifier of the logical core.

18. The method of claim 16, further comprising:

obtaining the first identifier of the virtual CPU from the first interrupt data structure;

locating a second table that associates a plurality of virtual CPU identifiers to a plurality of second interrupt data structures, respectively; and accessing the second table using the first identifier to locate the second interrupt data structure of the plurality of second interrupt data structures.

19. The method of claim 16, further comprising:

determining whether a posted type associated with the interrupt request is a user-level posted type, a kernel posted type, or a nested posted type.

20. One or more non-transitory machine readable storage media having instructions stored thereon, the instructions when executed by a machine are to cause the machine to:

identify, in a first table, an entry corresponding to an interrupt request from an external device coupled to a hardware platform, wherein the entry includes a first interrupt vector for a guest user application running on a virtual central processing unit (CPU) in a virtual machine corresponding to a logical core of a physical processor in the hardware platform;

obtain, from the entry, the first interrupt vector, a first pointer to a first interrupt data structure, and a second pointer to a second table that associates the first identifier of the virtual CPU to the second interrupt data structure;

locate, based on first information in the entry, the first interrupt data structure in memory including a first notification vector for the virtual CPU and a first identifier of the virtual CPU;

generate a first interrupt for the guest user application via the first interrupt data structure based on the first interrupt vector in the entry of the first table;

locate a second interrupt data structure in the memory based at least in part on second information in the entry and the first identifier of the virtual CPU; and generate a first notification interrupt for the virtual CPU with the second interrupt data structure based on the first notification vector in the first interrupt data structure.

21. The one or more non-transitory machine readable storage media of claim 20, wherein the instructions when executed by the machine are to cause the machine further to:

obtain a second notification vector and a second identifier of the logical core from the second interrupt data structure; and generate a second notification interrupt for the logical core of the physical processor using the second notification vector and the second identifier of the logical core.

22. The one or more non-transitory machine readable storage media of claim 20, wherein the instructions when executed by the machine are to cause the machine further to:

subsequent to receiving the interrupt request, receive a second interrupt request for the guest user application;

locate the first interrupt data structure associated with the guest user application; and in response to determining that a previous notification interrupt for the virtual CPU is pending, prevent generating another notification interrupt for the virtual CPU.

23. The one or more non-transitory machine readable storage media of claim 20, wherein the external device is separate from the physical processor of the hardware platform, and wherein the external device is either integrated with the hardware platform or separate from the hardware platform.

* * * * *